(12) United States Patent
Gao

(10) Patent No.: US 11,947,781 B2
(45) Date of Patent: Apr. 2, 2024

(54) AUTOMATICALLY ADJUSTING A LAYOUT OF A VISUAL ELEMENT ON A TO-BE-GENERATED INTERFACE AND QUICKLY GENERATING AN INTERFACE

(71) Applicant: HUAWEI TECHNOLOGIES CO., LTD., Guangdong (CN)

(72) Inventor: Zhang Gao, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/629,216

(22) PCT Filed: Jul. 23, 2020

(86) PCT No.: PCT/CN2020/103840
§ 371 (c)(1),
(2) Date: Jan. 21, 2022

(87) PCT Pub. No.: WO2021/013226
PCT Pub. Date: Jan. 28, 2021

(65) Prior Publication Data
US 2022/0269387 A1  Aug. 25, 2022

(30) Foreign Application Priority Data
Jul. 25, 2019  (CN) .......................... 201910678586.X

(51) Int. Cl.
*G06T 11/00* (2006.01)
*G06F 3/0484* (2022.01)
*G06V 20/60* (2022.01)
(52) U.S. Cl.
CPC ............ *G06F 3/0484* (2013.01); *G06T 11/00* (2013.01); *G06V 20/60* (2022.01); *G06F 2203/04803* (2013.01)

(58) Field of Classification Search
None
See application file for complete search history.

(56) References Cited

U.S. PATENT DOCUMENTS

2012/0189161 A1* 7/2012 Chang ...................... A61B 5/16
                                                             382/103
2014/0089795 A1   3/2014 Vienneau et al.
(Continued)

FOREIGN PATENT DOCUMENTS

CN    102572217 A    7/2012
CN    103744595 A    4/2014
(Continued)

*Primary Examiner* — Rinna Yi
(74) *Attorney, Agent, or Firm* — WOMBLE BOND DICKINSON (US) LLP

(57) ABSTRACT

Embodiments of this application provide an interface generation method and a device, where the method is applied to a device having a development function, and may provide a method for automatically adjusting a layout of a visual element on a to-be-generated interface to quickly generate an interface. The method includes: The device obtains a visual element of a reference interface, and obtains configuration information of a display of a target terminal device (501). The device determines a visual focus of the visual element based on attribute information of the visual element (502). The device determines, based on the configuration information of the display, an interface layout template corresponding to the configuration information (503). Finally, the device adjusts, based on the visual focus and the interface layout template, a layout of the visual element on a to-be-generated interface, and generates an interface (504).

13 Claims, 22 Drawing Sheets

(56) References Cited

U.S. PATENT DOCUMENTS

| | | | |
|---|---|---|---|
| 2015/0015614 A1* | 1/2015 | Doll | G06F 1/1613 |
| | | | 345/649 |
| 2015/0309704 A1* | 10/2015 | Bae | G06F 3/04883 |
| | | | 715/765 |
| 2016/0188162 A1* | 6/2016 | Lee | G06F 3/0485 |
| | | | 715/788 |
| 2017/0078504 A1 | 3/2017 | Nagata | |
| 2017/0140504 A1* | 5/2017 | Jeong | G06F 1/1677 |
| 2017/0150220 A1* | 5/2017 | Greene | H04N 21/4586 |
| 2017/0357518 A1 | 12/2017 | Kozloski et al. | |
| 2018/0137801 A1* | 5/2018 | An | G06T 3/0093 |
| 2018/0167634 A1* | 6/2018 | Salmimaa | H04N 19/167 |

FOREIGN PATENT DOCUMENTS

| | | |
|---|---|---|
| CN | 105912318 A | 8/2016 |
| CN | 106055337 A | 10/2016 |
| CN | 109471579 A | 3/2019 |
| CN | 110032420 A | 7/2019 |
| CN | 110554816 A | 12/2019 |
| WO | 2018023073 A1 | 2/2018 |

\* cited by examiner a b c

AUTOMATICALLY ADJUSTING A LAYOUT OF A VISUAL ELEMENT ON A TO-BE-GENERATED INTERFACE AND QUICKLY GENERATING AN INTERFACE

CROSS-REFERENCE TO RELATED APPLICATIONS

This application is a national stage of International Application No. PCT/CN2020/103840, filed on Jul. 23, 2020, which claims priority to Chinese Patent Application No. 201910678586.X, filed on Jul. 25, 2019. Both of the aforementioned applications are hereby incorporated by reference in their entireties.

TECHNICAL FIELD

This application relates to the field of terminal technologies, and in particular, to an interface generation method and a device.

BACKGROUND

With rapid development of network technologies, intelligent interactive devices such as smartphones, tablet computers, and interactive smart tablets become increasingly popular, bringing great convenience to people's lives, study, and work. As for different devices, resolutions may be different. For example, screen resolution of a smartphone is different from screen resolution of a tablet computer. Therefore, interface layouts of a graphical user interface (GUI) of a same application are accordingly different on the smartphone and the tablet computer. In an existing technology, designing and developing the GUI of each device needs developers to artificially design a visual element on demand, which requires a relatively heavy development workload, and a relatively long development cycle.

SUMMARY

This application provides an interface generation method and a device, to provide a method for automatically adjusting a layout of a visual element on a to-be-generated interface and quickly generating an interface.

According to a first aspect, an embodiment of this application provides an interface generation method, where the method is applied to a device having a development function. The method includes: The device first obtains a visual element of a reference interface and/or configuration information of a display of a target terminal device, and/or determines a visual focus of the visual element based on attribute information of the visual element. The device determines, based on the configuration information of the display, an interface layout template corresponding to the configuration information. Finally, the device adjusts, based on the visual focus and/or the interface layout template, a layout of the visual element on a to-be-generated interface, and/or generates an interface.

In some embodiments, the device may automatically adjust the layout of the visual element on the to-be-generated interface by using the visual element of an existing interface to quickly generate the interface. This improves utilization of the visual element and shortens a development cycle.

In some embodiments, the device determines a center point of a reference interface including the visual element as a first reference visual focus; performs (e.g., executes, implements) image content recognition on the visual element, and/or determines a second reference visual focus corresponding to an image content recognition result; determines a third reference visual focus corresponding to at least one of color information and/or a picture type that are of the visual element; and/or aggregates the first reference visual focus, the second reference visual focus, and/or the third reference visual focus to obtain the visual focus of the visual element.

In some embodiments, the device may determine a good visual focus by using the foregoing method. This helps improve an interface generation layout effect.

In some embodiments, the device adjusts, based on the interface layout template, a location of the visual element on the to-be-generated interface, and/or adjusts a location of a control on the to-be-generated interface. The device crops and/or scales the visual element by using the visual focus as a central point of the to-be-generated interface, and/or adjusts (e.g., modifies) a size of the control.

In some embodiments, the device may generate an interface with a good layout effect according to the foregoing method. This improves utilization of the visual element, and shortens the development cycle.

In some embodiments, if the target terminal device supports a screen splitting function, a display mode of the to-be-generated interface is a screen splitting mode, and the to-be-generated interface includes a first to-be-generated interface of a first application and a second to-be-generated interface of a second application, the device may obtain a first visual element of a reference interface of the first application and/or a second visual element of a reference interface of the second application. The device determines a first visual focus of the first to-be-generated interface of the first application based on attribute information of the first visual element, and/or determines a second visual focus of the second to-be-generated interface of the second application based on attribute information of the second visual element. The device determines, based on the configuration information of the display and/or the screen splitting mode, the interface layout template of the to-be-generated interface in the screen splitting mode. Finally, the device adjusts, based on the interface layout template of the to-be-generated interface in the split-screen mode and/or the first visual focus, a layout of the first visual element on the first to-be-generated interface, and/or generates an interface of the first application. The device adjusts, based on the interface layout template of the to-be-generated interface in the split-screen mode and/or the second visual focus, a layout of the second visual element on the second to-be-generated interface, and/or generates an interface of the second application.

In some embodiments, the device may automatically adjust a layout of the visual element on the to-be-generated interface by using a visual element of an interface displayed before screen splitting, to quickly generate the interface. This improves utilization of the visual element, and shortens the development cycle.

In some embodiments, the configuration information of the display includes at least one of the following content: a shape of the display, resolution of the display, whether touch is supported, and whether folding is supported. The interface layout template includes at least one of the following content: an interface display style, a layout parameter, and/or a control response manner.

According to a second aspect, an embodiment of this application provides a device, including a processor and a memory. The memory is configured to store one or more computer programs. When the one or more computer programs stored in the memory are executed by the processor, the device is enabled to perform the method according to any one of the first aspect or the possible designs of the first aspect.

According to a third aspect, an embodiment of this application further provides an apparatus. The apparatus includes modules/units for performing the method according to any one of the first aspect or the possible designs of the first aspect. These modules/units may be implemented by hardware, or may be implemented by hardware executing corresponding software.

According to a fourth aspect, an embodiment of this application further provides a computer-readable storage medium. The computer-readable storage medium includes a computer program. When the computer program is run on a device, the device is enabled to perform the method according to any one of the first aspect or the possible designs of the first aspect.

According to a fifth aspect, an embodiment of this application further provides a computer program product. When the computer program product is run on a terminal, a device is enabled to perform the method in any possible design according to any one of the first aspect or the possible designs of the first aspect.

These aspects or other aspects of this application are clearer and more comprehensible in the following descriptions of the embodiments.

DESCRIPTION OF EMBODIMENTS

The following describes the technical solutions in embodiments of this application with reference to the accompanying drawings in the embodiments of this application. The terms "first" and "second" below in the descriptions of the embodiments of this application are merely used for a description purpose, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise stated, "a plurality of" means two or more than two.

For ease of understanding, example descriptions of some concepts related to the embodiments of this application are provided for reference.

A visual element refers to image information visible to a user, for example, information such as a button, an image, or a text.

A visual focus refers to a location of a pixel that can attract most attention of the user, and usually refers to important information in the image information, such as a most attractive part of a face and landscape image.

A layout refers to an arrangement mode and a location that are of the visual element, such as a top margin, a left margin, a bottom margin, a right margin, a width, and a height that are of a control.

Figure 1:
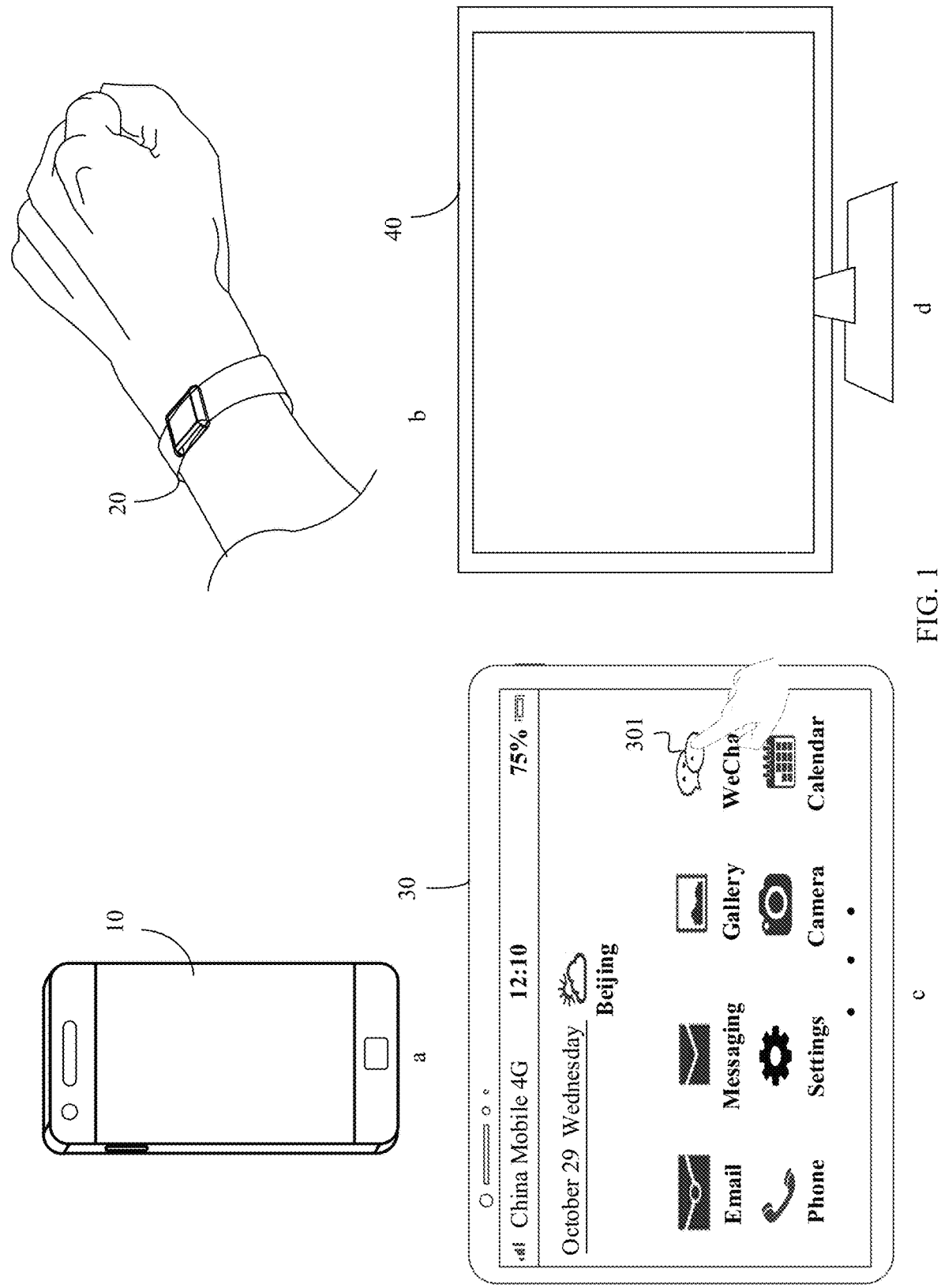
FIG. 1 is a schematic diagram of a plurality of types of terminal devices according to an embodiment of this application.

With popularization of mobile terminal devices such as smartphones and tablet computers, users are gradually accustomed to using application (APP) client software to access the Internet. Currently, major domestic e-commerce companies have their own APP client software. This indicates that usage of the APP client software shows its superiority. However, with continuous development of resolution and screen sizes of the smartphones and tablet computers, the resolution and the screen sizes of devices of different models are different. For example, the resolution and the screen sizes of a smartphone 10, a smart watch 20, a tablet computer 30, and a smart TV 40 shown in FIG. 1 are different. Therefore, if APP client software with a good layout effect on the smartphone 10 is directly installed and run on the smart watch 20, a layout effect may be unsatisfactory. For example, an aspect ratio of an interface does not match with the smart watch 20, or a location of a control on the interface is unreasonable.

For the foregoing problem, a common solution in an existing technology is: A user interface (UI) engineer redraws a set of image resources applicable to the smart watch. A software developer re-modifies code of the APP client software in an integrated development environment (IDE), and compiles and packages the modified code and the new image resources to implement a good layout of the APP client software of the smart watch. The IDE is an application program used in a program development environment, and usually includes a code editor, a compiler, an adjuster, and a graphical UI tool. For example, Xcode programming software in an iOS system and Android Studio programming software in an Android system are typical IDEs. It can be learned that this solution relies on UI engineers to artificially design the visual element on demand. Consequently, a development workload is relatively heavy, a development cycle is relatively long, and an image resource reuse rate of the APP client software is low.

For a problem of the existing technology, an embodiment of this application provides an interface generation method. The method may be applied to a device having a development function. The device first obtains a visual element of a reference interface and an interface layout template of a to-be-generated interface, then determines a visual focus of the visual element based on attribute information of the visual element and configuration information of a display of the device, to determine a layout of the visual element on the to-be-generated interface based on the visual focus and the interface layout template of the to-be-generated interface, and finally generates an interface with a good layout effect. In this embodiment of this application, the device may automatically adjust the layout of the visual element on the to-be-generated interface by using the visual element of an existing interface, to quickly generate the interface. This improves utilization of the visual element, and shortens a development cycle.

Figure 2:
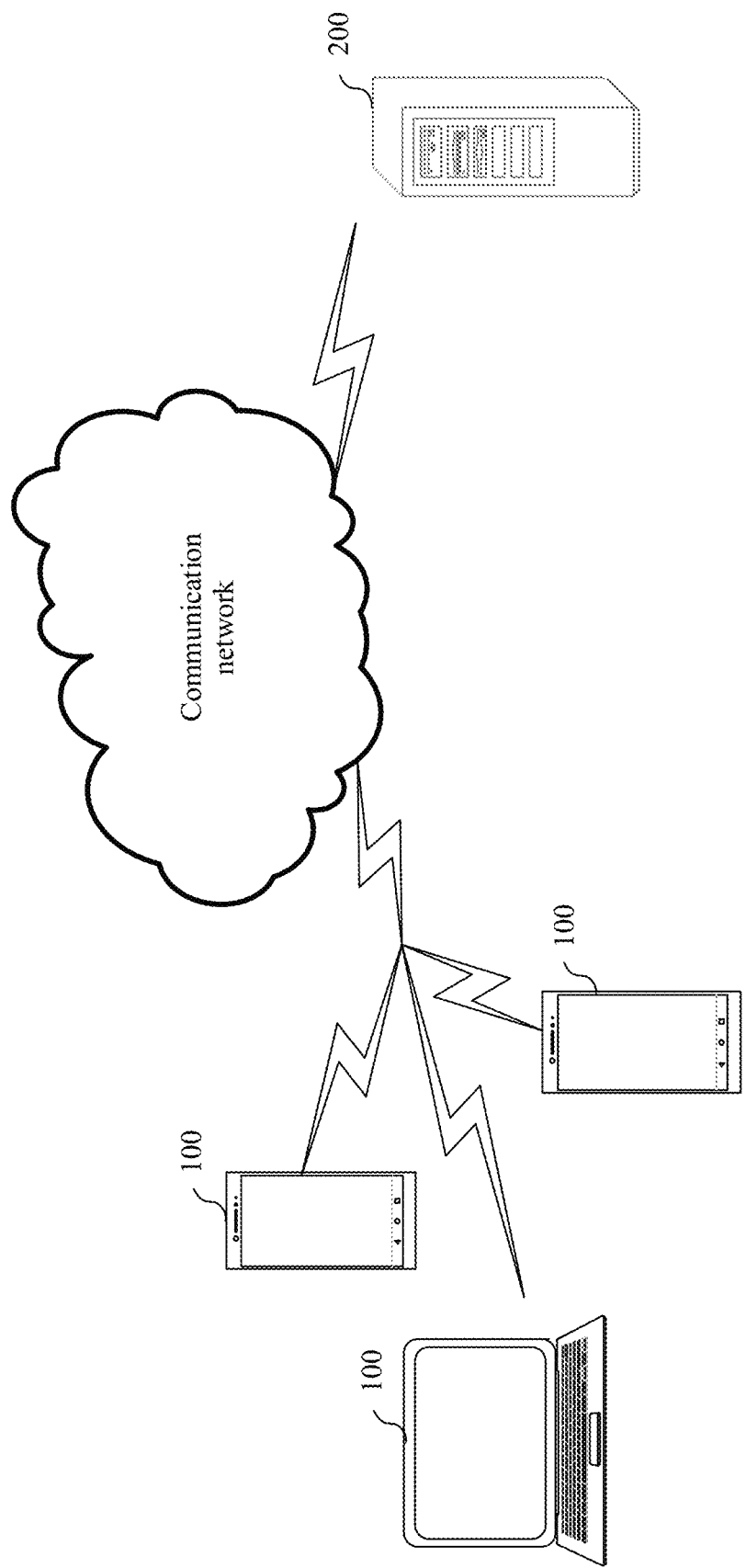
FIG. 2 is a schematic diagram of a communication system according to an embodiment of this application.

As shown in FIG. 2, an embodiment of this application provides a communication system. The communication system includes terminal devices 100 and a device 200. The terminal devices 100 and the device 200 may be directly connected by using a data cable, or may communicate with each other by using a communication network. The device 200 is installed with an integrated development environment (IDE) for compiling and generating software packages of the terminal devices 100.

The communication network may be a local area network, or may be a wide area network for switch over through a relay device or may include a local area network and a wide area network. When the communication network is a local area network, for example, the communication network may be a short-distance communication network such as a Wi-Fi hotspot network, a Wi-Fi direct network, a Bluetooth network, a ZigBee network, or a near field communication (NFC) network. For example, when the communication network is a wide area network, for example, the communication network may be a 3rd generation wireless communication technology (3G) network, a 4th generation mobile communication technology (4G) network, a 5th generation mobile communication technology (5G) network, a future evolved public land mobile network (PLMN), or the Internet.

In some embodiments, the device 200 may automatically encode and generate the interface of the application by using the foregoing interface generation method, and a developer compiles and packs a software package on the device 200. The terminal device 100 obtains a software package from the device 200, and installs the software package locally. When the application is run on the terminal device 100, a display of the terminal device 100 displays the interface generated according to the foregoing interface generation method.

Figure 3:
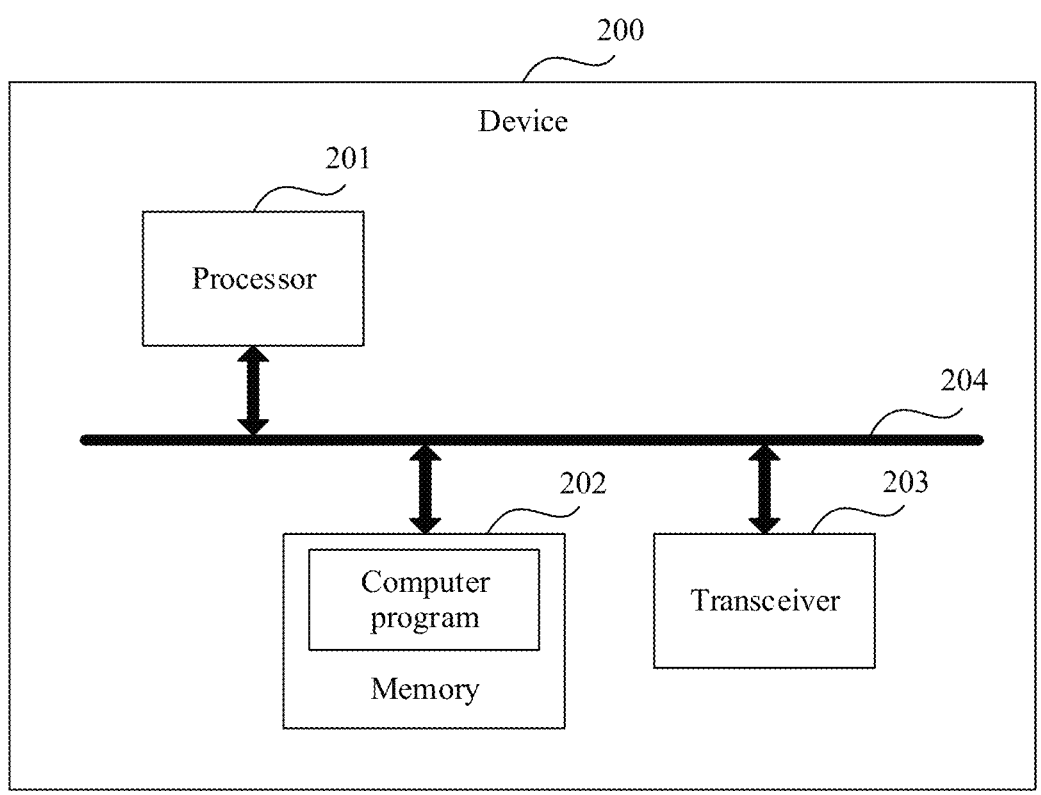
FIG. 3 is a schematic diagram of a structure of a device according to an embodiment of this application.

In some embodiments of this application, the device 200 may be a server or cloud server with a compilation function. FIG. 3 is a block diagram of a partial structure of the device 200 related to the embodiments of this application. As shown in FIG. 3, the device 200 may include a processor 201, a memory 202, and a transceiver 203. One or more computer programs are stored in the memory 202 and configured to be executed by one or more processors 201.

The processor 201 may be a central processing unit (CPU), a digital processing unit, or the like. As a control center of the device 200, the processor 201 is connected to all parts of the entire device by using various interfaces and lines, and performs various functions and data processing of the device 200 by running or executing the computer programs stored in the memory 202 and invoking data stored in the memory 202.

The memory 202 is configured to store a to-be-run computer program. If the device 200 is a cloud server, the memory 202 further stores a compilation result that is obtained from a server with a compilation function and that is generated through compilation by an operating system, where the compilation result includes an application software package of an application program. In addition, if the device 200 is a server with a compilation function, the memory 202 stores operating system source code and a compilation result generated through compilation by using the operating system source code. The compilation result includes the application software package of the application.

The transceiver 203 is configured to send the software package generated by the processor 201 to the terminal device 100.

In this embodiment of this application, a specific connection medium between the processor 201 and the memory 202 is not limited. In this embodiment of this application, for example, the memory 202, the processor 201, and the transceiver 203 are connected by using a bus 204 in FIG. 3. The bus is represented by using a bold line in FIG. 3. A connection manner between other parts is merely an example for description, and is not limited thereto. The bus may be classified into an address bus, a data bus, a control bus, and the like. For ease of representation, only one bold line is used to represent the bus in FIG. 3, but this does not mean that there is only one bus or only one type of bus.

The memory 202 may be a volatile memory such as a random access memory (RAM). In some embodiments, the memory 202 may be a non-volatile memory as a read-only memory, a flash memory, a hard disk drive (HDD), or a solid-state drive (SSD). In some embodiments, the memory 202 is any other medium that can be used to carry or store expected program code in a form of an instruction or a data structure and can be accessed by a computer. In some embodiments, the memory 202 may alternatively be a combination of the foregoing memories.

In some embodiments of this application, the terminal device 100 may be a portable device, for example, a mobile phone, a tablet computer, or a wearable device (for example, a smart watch) with a wireless communication function. The portable device includes but is not limited to a portable device equipped with iOS®, Android®, Microsoft®, or another operating system. It should be further understood that, in some other embodiments, the foregoing device may not be the portable device but a desktop computer.

Figure 4:
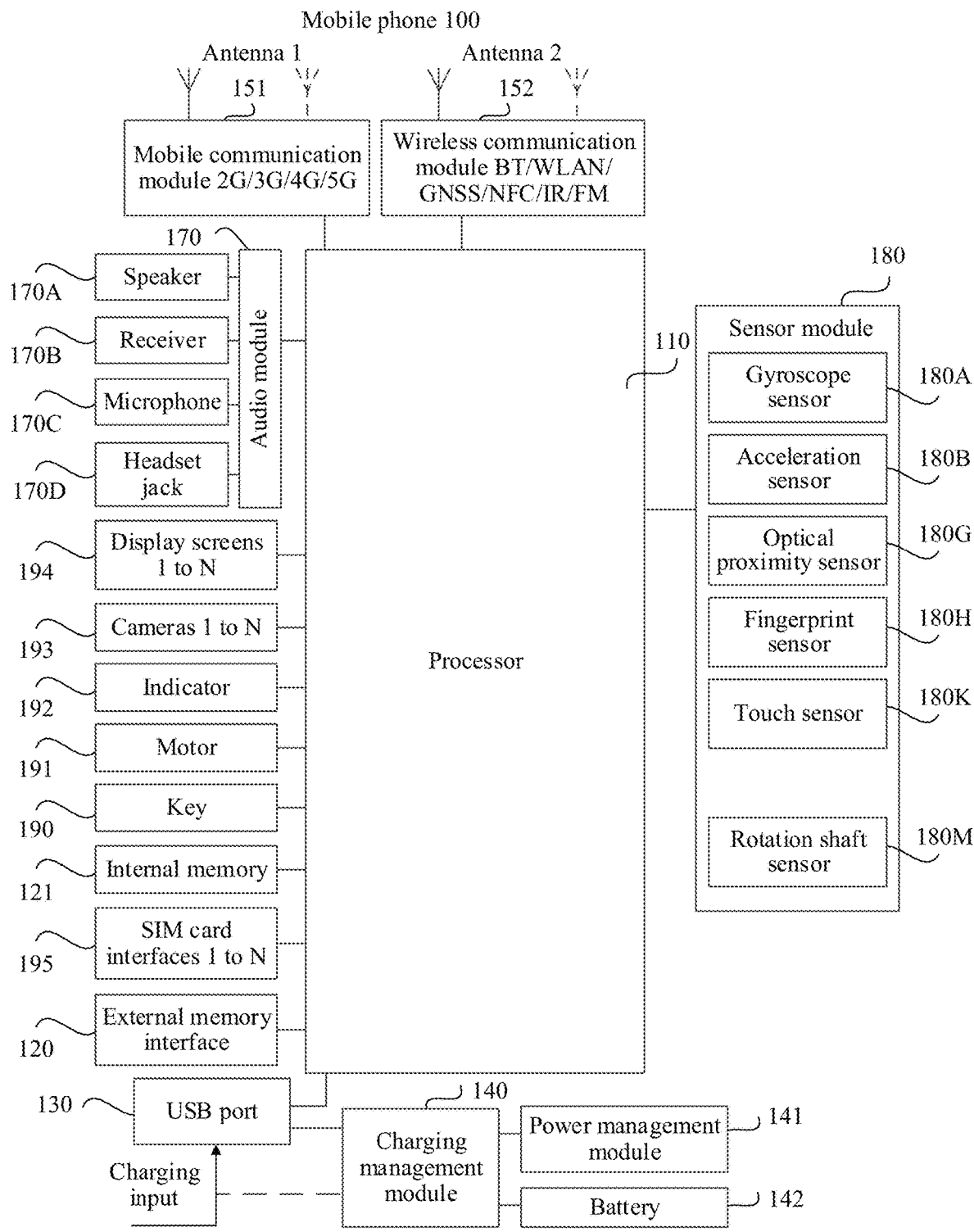
FIG. 4 is a schematic diagram of a structure of a terminal device according to an embodiment of this application.

FIG. 4 is a schematic diagram of a structure of the terminal device 100.

The terminal device 100 may include a processor 110, an external memory interface 120, an internal memory 121, a USB port 130, a charging management module 140, a power management module 141, a battery 142, an antenna 1, an antenna 2, a mobile communication module 151, a wireless communication module 152, an audio module 170, a speaker 170A, a receiver 170B, a microphone 170C, a headset jack 170D, a sensor module 180, a key 190, a motor 191, an indicator 192, a camera 193, a display 194, a SIM card interface 195, and the like. The sensor module 180 may include a gyroscope sensor 180A, an acceleration sensor 180B, an optical proximity sensor 180G, a fingerprint sensor 180H, a touch sensor 180K, and a rotating shaft sensor 180M (where certainly, the terminal device 100 may further include another sensor, for example, a temperature sensor, a distance sensor, an ambient light sensor, a barometric pressure sensor, or a bone conduction sensor, which is not shown in the figure).

It may be understood that the structure shown in this embodiment of the present disclosure does not constitute a specific limitation on the terminal device 100. In some other embodiments of this application, the terminal device 100 may include more or fewer parts than those shown in the figure, or combine some parts, or split some parts, or have different component arrangements. The parts shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors. The controller may be a nerve center and a command center of the terminal device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data used or cyclically used by the processor 110. If the processor 110 needs to use the instructions or the data again, the processor may directly invoke the instructions or the data from the memory. This avoids repeated access and reduces waiting time of the processor 110, so that system efficiency is improved. In this embodiment of this application, the processor 110 may run the software package obtained from the device 200.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, quantum dot light emitting diodes (QLED), or the like. In some embodiments, the terminal device 100 may include one or N displays 194, where N is a positive integer greater than 1.

The camera 193 (e.g., a front-facing camera, a rear-facing camera, or a camera that may serve as both a front-facing camera and a rear-facing camera) is configured to capture a static image or a video. Usually, the camera 193 may include photosensitive elements such as a lens group and an image sensor. The lens group includes a plurality of lenses (e.g., convex lenses or concave lenses), and is configured to: collect an optical signal reflected by a to-be-photographed object, and transfer the collected optical signal to the image sensor. The image sensor generates an original image of the to-be-photographed object based on the optical signal.

The internal memory 121 may be configured to store computer-executable program code. The executable program code includes instructions. The processor 110 runs the instructions stored in the internal memory 121, to perform various function applications and data processing of the terminal device 100. The internal memory 121 may include a program storage area and a data storage area. The program storage area may store code of an operating system, an application (for example, a camera application or a WeChat application), and the like. The data storage area may store data (for example, an image or a video collected by the camera application) created during use of the terminal device 100 and the like.

In addition, the internal memory 121 may include a high-speed random access memory, and may further include a non-volatile memory, for example, at least one magnetic disk storage device, a flash memory device, or a universal flash storage (UFS).

The following describes functions of the sensor module 180.

The gyroscope sensor 180A (or a gyroscope for short) is a main component of the IMU, and may be configured to determine a motion posture of the terminal device 100. In some embodiments, angular velocities of the terminal device 100 around three axes (namely, x, y, and z axes) may be determined by using the gyroscope sensor 180A.

The acceleration sensor 180B (or an accelerometer for short) is a main component of the IMU, and may be configured to detect values of accelerations of the terminal device 100 in all directions (usually on three axes). In other words, the acceleration sensor 180B may be configured to detect a current motion status of the terminal device 100, for example, shaking or stationary.

The optical proximity sensor 180G may include, for example, a light-emitting diode (LED) and an optical detector such as a photodiode. The light-emitting diode may be an infrared light-emitting diode. The terminal device emits infrared light outwards by using the light-emitting diode. The terminal device detects infrared reflected light from a nearby object by using the photodiode. When plenty of reflected light is detected, the terminal device may determine that there is an object near the terminal device. When inadequate reflected light is detected, the terminal device may determine that there is no object near the terminal device.

The gyroscope sensor 180A (or the acceleration sensor 180B) may send detected motion status information (for example, the angular velocity) to the processor 110. The processor 110 determines, based on the motion status information, whether the terminal device is currently in a handheld state or a tripod state (for example, when the angular velocity is not 0, it indicates that the terminal device 100 is in the handheld state).

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The touch sensor 180K is also referred to as a "touch panel". The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the terminal device 100, and at a location different from that of the display 194.

For example, the display 194 of the terminal device 100 displays a home screen, and the home screen includes icons of a plurality of applications (for example, a camera application and WeChat). The user taps an icon of a sweeping robot application on the home screen by using the touch sensor 180K to trigger the processor 110 to start the sweeping robot application and open a sweeping map. The display 194 displays an interface of the sweeping robot application, such as a sweeping map interface.

A wireless communication function of the terminal device 100 may be implemented by using the antenna 1, the antenna 2, the mobile communication module 151, the wireless communication module 152, the modem processor, the baseband processor, and the like.

The antenna 1 and the antenna 2 are configured to transmit and receive electromagnetic wave signals. Each antenna in the terminal device 100 may be configured to cover a single or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 151 can provide a wireless communication solution that is applied to the terminal device 100, and that includes 2G/3G/4G/5G and the like. The mobile communication module 151 may include at least one filter, a switch, a power amplifier, a low noise amplifier (LNA), and the like. The mobile communication module 151 may receive an electromagnetic wave through the antenna 1, perform processing such as filtering and amplification on the received electromagnetic wave, and transmit the electromagnetic wave to the modem processor for demodulation. The mobile communication module 151 may further amplify a signal modulated by the modem processor, and convert the signal into an electromagnetic wave for radiation through the antenna 1. In some embodiments, at least some functional modules of the mobile communication module 151 may be disposed in the processor 110. In some embodiments, at least some functional modules of the mobile communication module 151 and at least some modules of the processor 110 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. The demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communication module 151 or another functional module.

The wireless communication module 152 may provide a solution that is applied to the terminal device 100 and that includes wireless communication such as a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communication module 152 may be one or more components integrating at least one communication processing module. The wireless communication module 152 receives an electromagnetic wave through the antenna 2, performs frequency modulation and filtering processing on an electromagnetic wave signal, and sends a processed signal to the processor 110. The wireless communication module 152 may further receive a to-be-sent signal from the processor 110, perform frequency modulation and amplification on the signal, and convert the signal into an electromagnetic wave for radiation through the antenna 2.

The terminal device 100 may implement an audio function by using the audio module 170, the speaker 170A, the receiver 170B, the microphone 170C, the headset jack 170D, the application processor, and the like, for example, music playing and recording. The terminal device 100 may receive an input of the key 190, and generate a key signal input related to user setting and function control of the terminal device 100. The terminal device 100 may generate a vibration prompt (for example, an incoming call vibration prompt) by using the motor 191. The indicator 192 in the terminal device 100 may be an indicator light, and may be configured to indicate a charging status and a power change, and may further be configured to indicate a message, a missed call, a notification, and the like. The SIM card interface 195 in the terminal device 100 is configured to connect to a SIM card. The SIM card may be inserted into the SIM card interface 195 or removed from the SIM card interface 195, to implement contact with or separation from the terminal device 100.

It should be understood that, in actual application, the terminal device 100 may include more or fewer parts than those shown in FIG. 4. This is not limited in the embodiments of this application.

Figure 5:
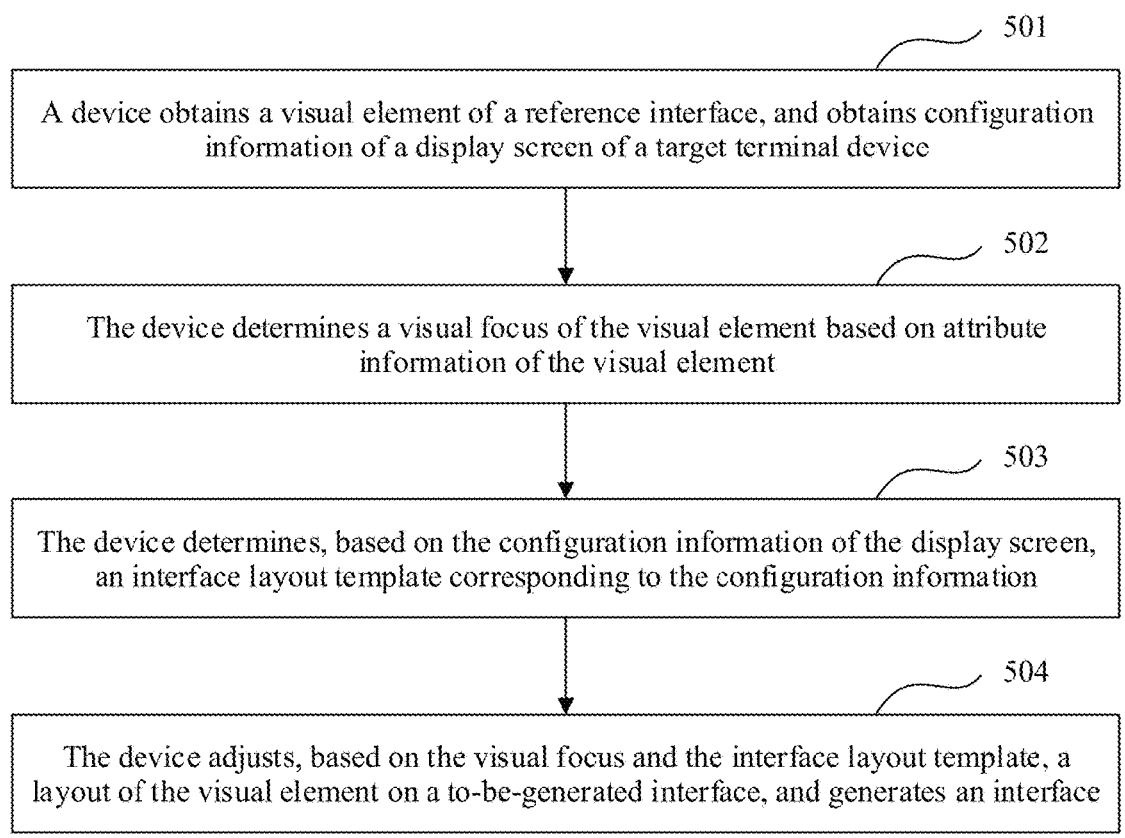
FIG. 5 is a schematic diagram of an interface generation method according to an embodiment of this application.

FIG. 5 is a schematic flowchart of an interface generation method according to an embodiment of this application. The method may be performed by the device 200. More specifically, refer to FIG. 3. The processor 201 in the device 200 may invoke a computer program stored in the memory 202 to perform the method in combination with the transceiver 203. Specific operations are as follows.

Operation 501: The processor 201 in the device 200 may obtain a visual element of a reference interface by using the transceiver 203, and obtain configuration information of a display of a target terminal device.

A visual element of a reference interface of an application program may come from the target terminal device, or may come from another terminal device. The visual element refers to an interface display object of the reference interface. The configuration information of the display of the target terminal device includes a screen size, screen resolution, whether a touch function is supported, whether full-screen display is performed, and the like.

Operation 502: The processor 201 in the device 200 determines a visual focus of the visual element based on attribute information of the visual element.

In some embodiments, the attribute information of the visual element refers to information such as a size, a center point, resolution, and a color of the visual element. The memory 202 in the device 200 may prestore a visual focus library. The visual focus library stores a correspondence between an image recognition result and the visual focus, a correspondence between a color of the visual element and the visual focus, and a correspondence between an image type of the visual element and the visual focus. Further, the processor 201 in the device 200 may match at least one that is obtained and of the image recognition result of the visual element, the color of the visual element, and the image type of the visual element with information in the visual focus library stored in the memory 202, and determine at least one reference visual focus. Finally, the processor 201 in the device aggregates reference visual focuses, and calculates that a location with a largest probability is the obtained visual focus of the visual element.

Operation 503: The processor 201 in the device 200 determines, based on the obtained configuration information of the display, an interface layout template corresponding to the configuration information.

In some embodiments, different displays correspond to different interface layout templates. The interface layout template includes at least one of the following content: an interface display framework, a default layout parameter, and a control response manner. The interface display frame includes a location, a size, an arrangement manner, and the like of a to-be-displayed object. The to-be-displayed object may be an image resource, a control, or the like.

Figure 6A:
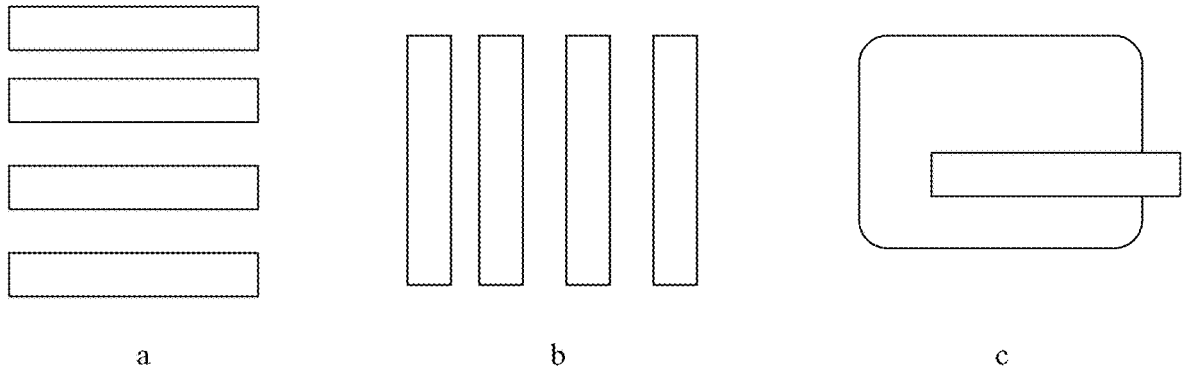
FIG. 6a to FIG. 6d are each a schematic diagram of an interface layout template according to an embodiment of this application.
Figure 6B:
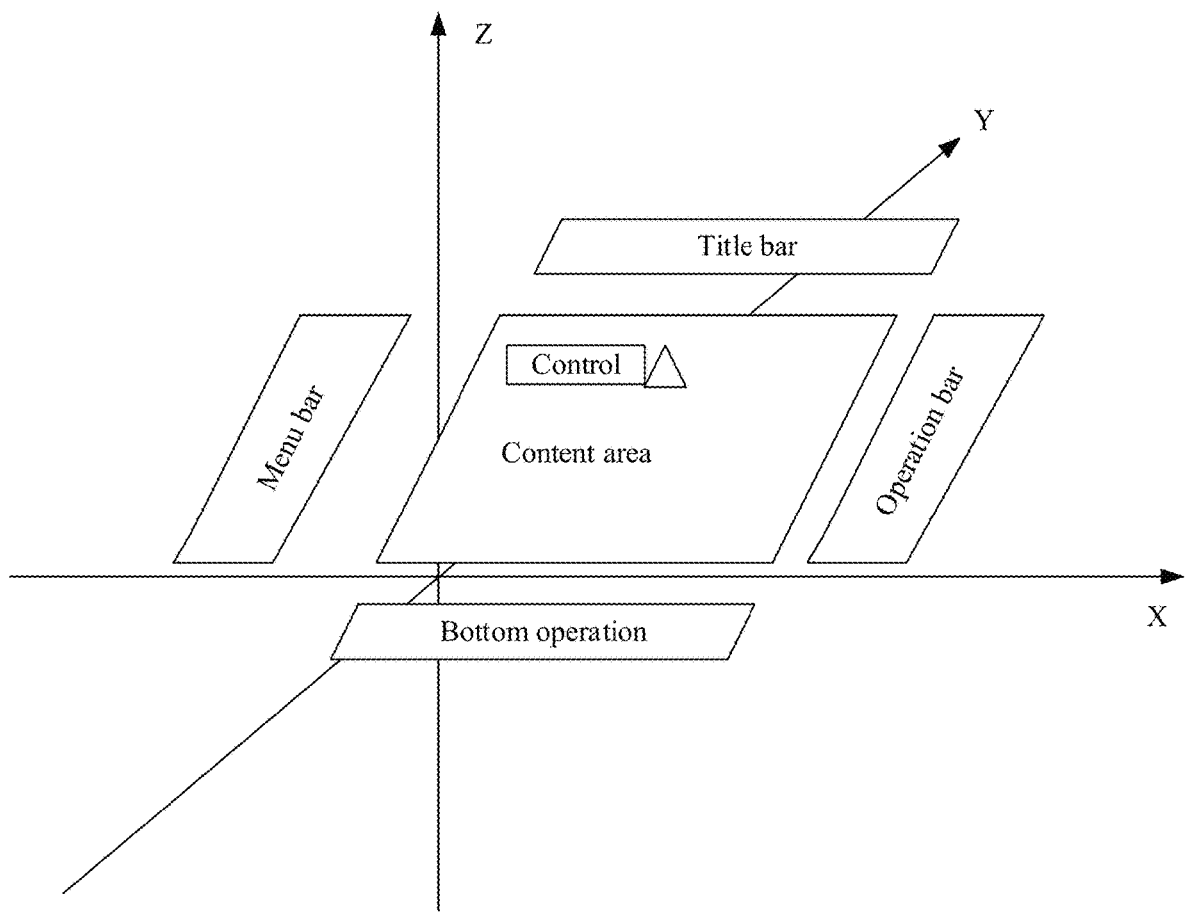
Figure 6C:
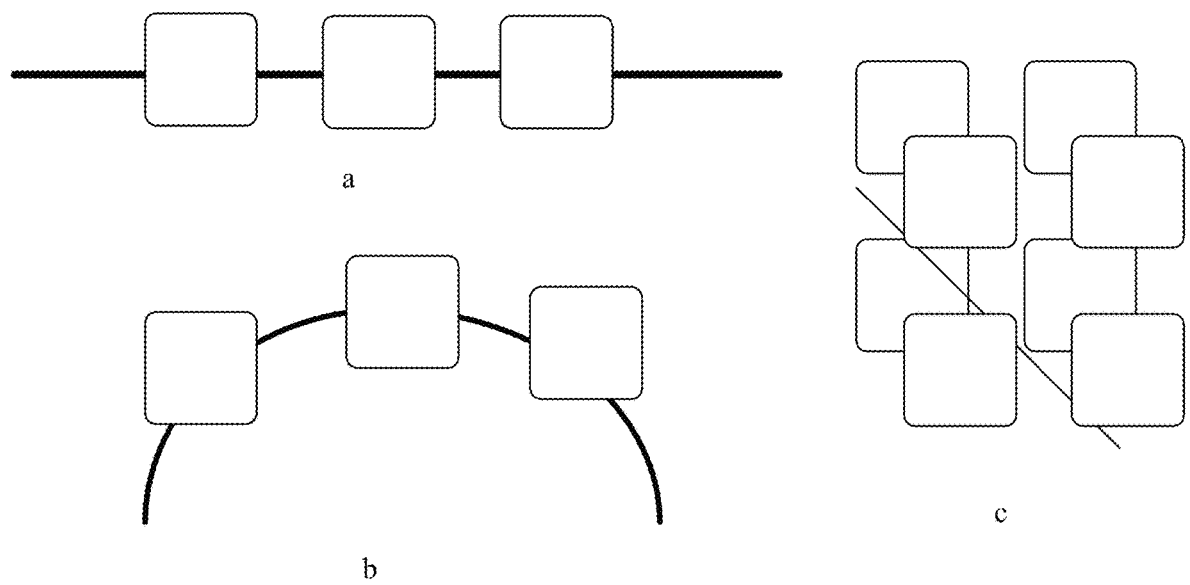
Figure 6D:
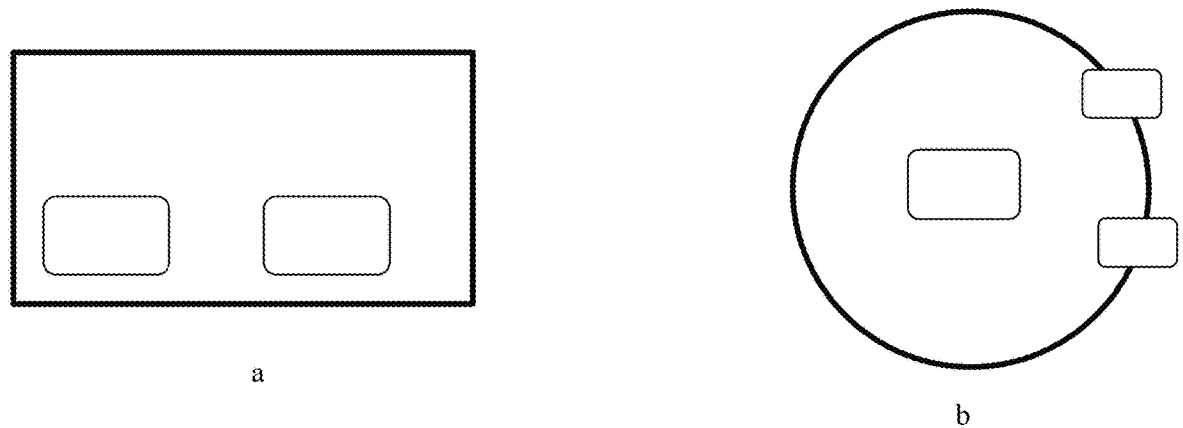

In some embodiments, the memory 202 in the device 200 may prestore arrangement manner templates, location templates, alignment manner templates, and control location templates that are corresponding to different configuration information. The processor 201 in the device 200 aggregates these types of templates, and finally generates an interface layout template of a to-be-generated interface. As shown in FIG. 6*a*, the arrangement manner template may have three types: a horizontal arrangement manner (as shown in a in FIG. 6*a*), a vertical arrangement manner (as shown in b in FIG. 6*a*), and an overlapping arrangement manner (as shown in c in FIG. 6*a*). The location template may be shown in FIG. 6*b*. In a spatial coordinate system, the interface is divided into a plurality of areas, such as a title bar, an operation bar, a menu bar, a bottom operation, and a content area. As shown in FIG. 6*c*, the alignment manner template may include straight line alignment (as shown in a in FIG. 6*c*), curve alignment (as shown in b in FIG. 6*c*), and overlapping manner alignment (as shown in c in FIG. 6*c*). As shown in FIG. 6*d*, the control location template may have two types: a rectangular box distribution manner (as shown in a in FIG. 6*d*) and a circular box distribution manner (as shown in b in FIG. 6*d*).

Operation 504: The processor 201 in the device 200 adjusts, based on the visual focus obtained in operation 502 and the interface layout template obtained in operation 503, a layout of the visual element obtained in operation 501 on the to-be-generated interface, and generates an interface.

In some embodiments, the processor 201 in the device 200 may adjust, based on the interface layout template obtained in operation 503, a location of the visual element obtained in operation 501 on the to-be-generated interface, and adjust a location of the control on the to-be-generated interface. The processor 201 in the device 200 crops and/or scales the visual element obtained in operation 501 by using the visual focus obtained in operation 502 as a central point of the to-be-generated interface, and adjust a size of the control.

It can be learned from the foregoing descriptions that, the interface generation method provided in this embodiment of this application can reduce development difficulty of an application interface, improve development efficiency, and reduce development costs.

In some embodiments, the visual focus may be user-defined, or may be determined through image recognition, for example, an element such as a face and a clear object on the interface. In some embodiments, the visual focus may be alternatively obtained by using a visual focus algorithm fusion. In some embodiments, the device 200 may determine a center point of a reference interface including the visual element as a first reference visual focus; perform image content recognition on the visual element, and determine a second reference visual focus corresponding to an image content recognition result; and determine a third reference visual focus corresponding to at least one of color information and a picture type that are of the visual element. The device 200 aggregates the first reference visual focus, the second reference visual focus, and the third reference visual focus to obtain the visual focus of the visual element.

In some embodiments, if a display mode of the to-be-generated interface is a screen splitting mode, and the target terminal device supports a screen splitting function, the device 200 may separately obtain a first visual element of a reference interface of a first application and a second visual element of a reference interface of a second application. The device 200 determines a first visual focus of a first to-be-generated interface of the first application based on attribute information of the first visual element, and determines a second visual focus of a second to-be-generated interface of the second application based on attribute information of the second visual element. The device 200 determines, based on the configuration information of the display of the target terminal device and the screen splitting mode, the interface layout template of the to-be-generated interface in the screen splitting mode, and finally adjusts, based on the interface layout template of the to-be-generated interface in the screen splitting mode and the first visual focus, a layout of the first visual element on the first to-be-generated interface and generates an interface of the first application. The device 200 adjusts, based on the interface layout template of the to-be-generated interface in the split-screen mode and the second visual focus, a layout of the second visual element on the second to-be-generated interface, and generates an interface of the second application.

With reference to the accompanying drawings and specific application scenarios, the following describes the interface generation method provided in this embodiment of this application by using examples. It is assumed that the memory 202 in the device 200 prestores a visual element of a reference interface shown in FIG. 7, the reference interface is a reference interface of a magazine lock screen application, and the visual element of the reference interface is an image. Generally, the visual element has a relatively large size and relatively high resolution, to adapt to another terminal device.

Scenario 1

The device 200 obtains a configuration parameter of the display of the smartphone 10 in FIG. 1, for example, an aspect ratio or resolution of the display of the smartphone 10. The device 200 obtains an interface layout template corresponding to the configuration parameter. In some embodiments, the device 200 may obtain an arrangement manner template, a location template, an alignment manner template, a control location template, and the like that are corresponding to the configuration parameter, and finally generate an interface layout template shown in FIG. 8*a*. The device determines a visual focus (where the visual focus is an arrow location shown in FIG. 7) of the visual element based on a color, a picture type, and an image recognition result of the visual element shown in FIG. 7. The device 200 crops and scales the visual element by using the visual focus as a center point of a to-be-generated interface, adjusts a layout of the visual element on the to-be-generated interface based on the interface layout template, and finally generates an interface shown in FIG. 8*b*.

Scenario 2

Figure 9:
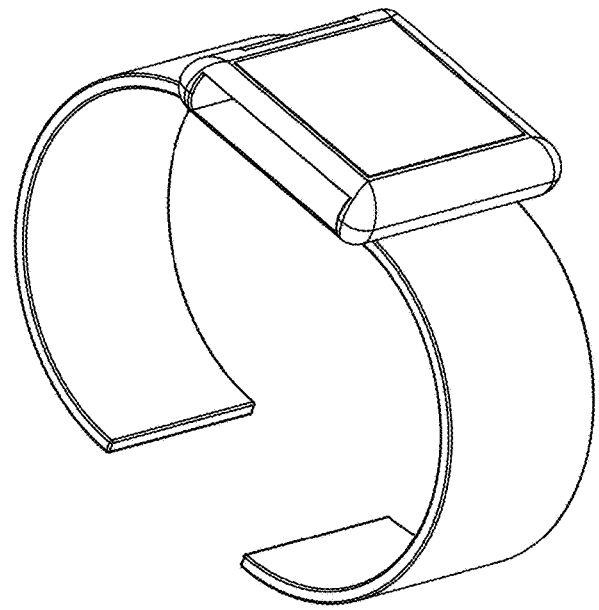
FIG. 9 and FIG. 10 are each a schematic diagram of an interface of a smart watch according to an embodiment of this application.
Figure 9:
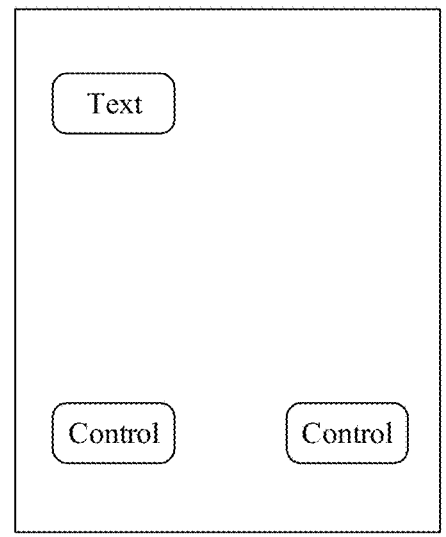
Figure 9:
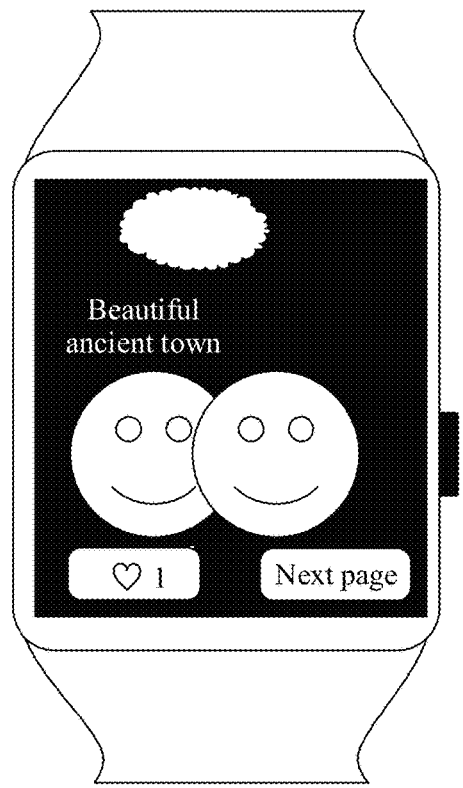

The device 200 obtains a configuration parameter of the display of the smart watch 20 in a in FIG. 9, for example, an aspect ratio or resolution of the display of the smart watch 20. The device 200 obtains an interface layout template corresponding to the configuration parameter. In some embodiments, the device 200 may obtain an arrangement manner template, a location template, an alignment manner template, a control location template, and the like that are corresponding to the configuration parameter, and finally generate an interface layout template shown in b in FIG. 9. The device determines a visual focus (where the visual focus is an arrow location shown in FIG. 7) of the visual element based on a color, a picture type, and an image recognition result of the visual element shown in FIG. 7. The device crops and scales the visual element by using the visual focus as a center point of a to-be-generated interface, adjusts a layout of the visual element on the to-be-generated interface based on the interface layout template shown in b in FIG. 9, and finally generates an interface shown in c in FIG. 9.

Scenario 3

Figure 10:
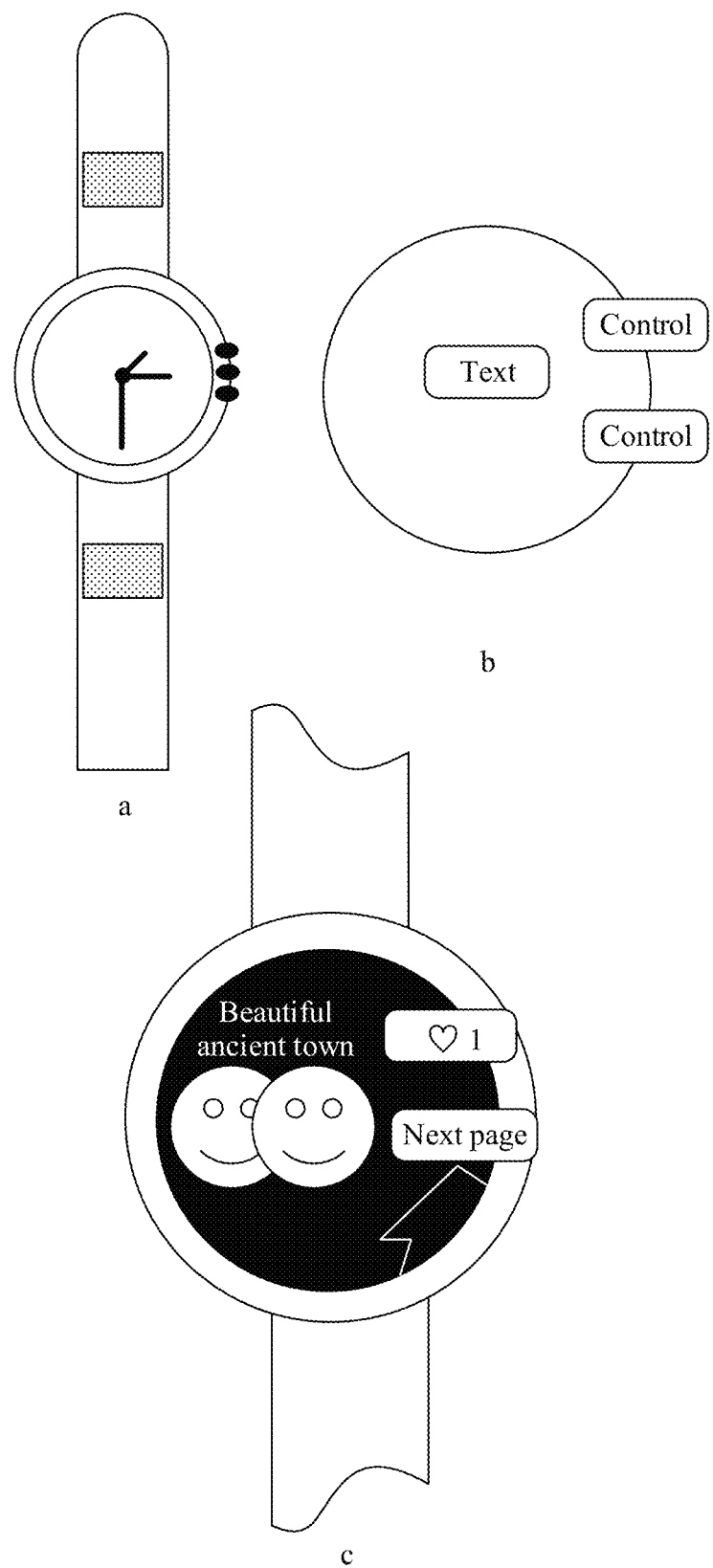

The device 200 obtains a configuration parameter of the display of the smart watch 20 in a in FIG. 10, for example, an aspect ratio or resolution of the display of the smart watch 20. The device 200 obtains an interface layout template corresponding to the configuration parameter. In some embodiments, the device 200 may obtain an arrangement manner template, a location template, an alignment manner template, a control location template, and the like that are corresponding to the configuration parameter, and finally generate an interface layout template shown in b in FIG. 10. The device 200 determines a visual focus (where the visual focus is an arrow location shown in FIG. 7) of the visual element based on a color, a picture type, and an image recognition result of the visual element shown in FIG. 7. The device 200 crops and scales the visual element by using the visual focus as a center point of a to-be-generated interface, adjusts a layout of the visual element on the to-be-generated interface based on the interface layout template shown in b in FIG. 10, and finally generates an interface shown in c in FIG. 10.

Scenario 4

Figure 11:
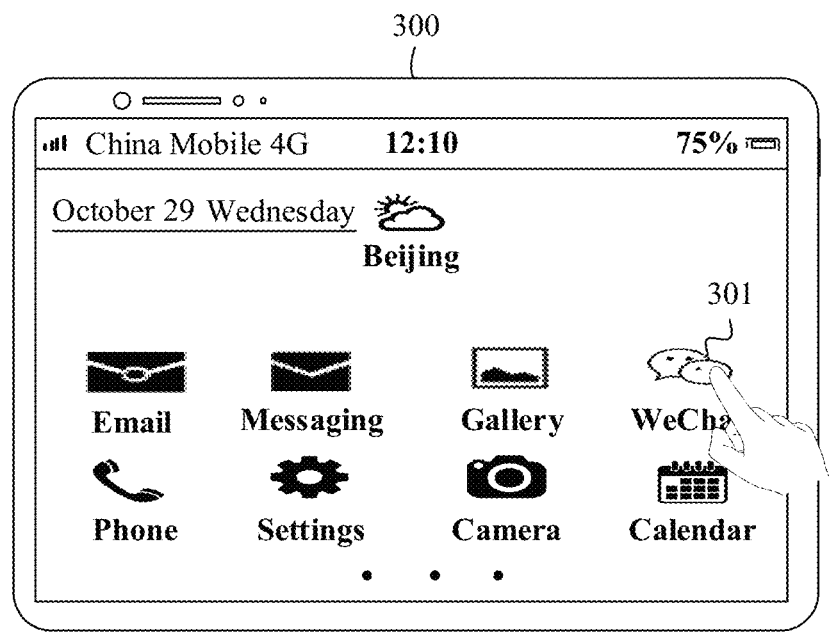
FIG. 11 is a schematic diagram of an interface of a tablet computer according to an embodiment of this application.
Figure 11:
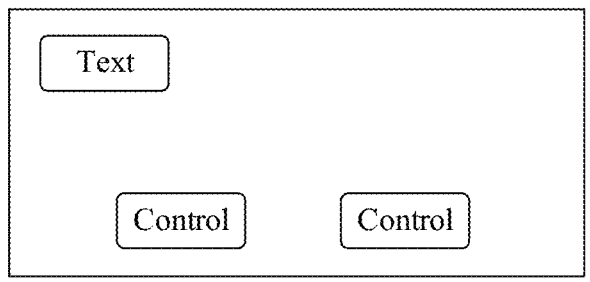
Figure 11:
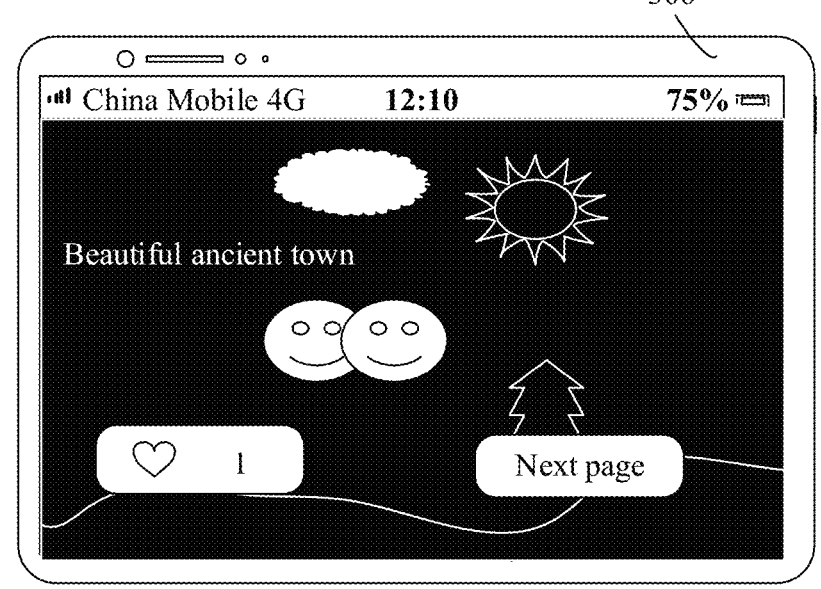

The device 200 obtains a configuration parameter of the display of the tablet computer 30 in a in FIG. 11, for example, an aspect ratio or resolution of the display of the tablet computer 30. The device 200 obtains an interface layout template corresponding to the configuration parameter. In some embodiments, the device 200 may obtain an arrangement manner template, a location template, an alignment manner template, a control location template, and the like that are corresponding to the configuration parameter, and finally generate an interface layout template shown in b in FIG. 11. The device determines a visual focus (where the visual focus is an arrow location shown in FIG. 7) of the visual element based on a color, a picture type, and an image recognition result of the visual element shown in FIG. 7. The device 200 crops and scales the visual element by using the visual focus as a center point of a to-be-generated interface, adjusts a layout of the visual element on the to-be-generated interface based on the interface layout template shown in b in FIG. 11, and finally generates an interface shown in c in FIG. 11.

Scenario 5

Figure 12:
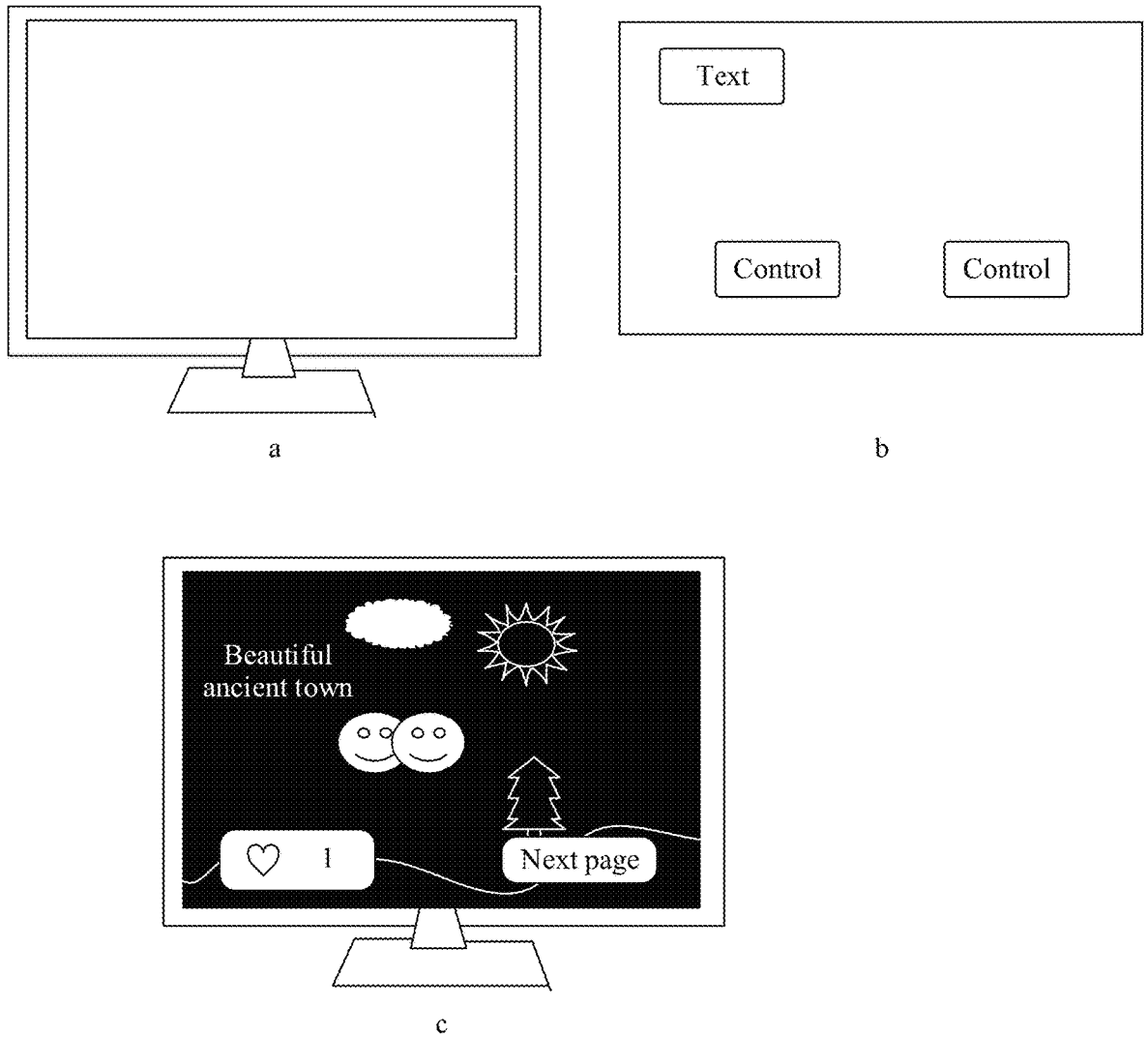
FIG. 12 is a schematic diagram of an interface of a smart TV according to an embodiment of this application.

The device 200 obtains a configuration parameter of the display of the smart TV 40 in a in FIG. 12, for example, an aspect ratio or resolution of the display of the smart TV 40. The device 200 obtains an interface layout template corresponding to the configuration parameter. In some embodiments, the device 200 may obtain an arrangement manner template, a location template, an alignment manner template, a control location template, and the like that are corresponding to the configuration parameter, and finally generate an interface layout template shown in b in FIG. 12. The device 200 determines a visual focus (where the visual focus is an arrow location shown in FIG. 7) of the visual element based on a color, a picture type, and an image recognition result of the visual element shown in FIG. 7. The device 200 crops and scales the visual element by using the visual focus as a center point of a to-be-generated interface, adjusts a layout of the visual element on the to-be-generated interface based on the interface layout template shown in b in FIG. 12, and finally generates an interface shown in c in FIG. 12.

Scenario 6

Figure 13:
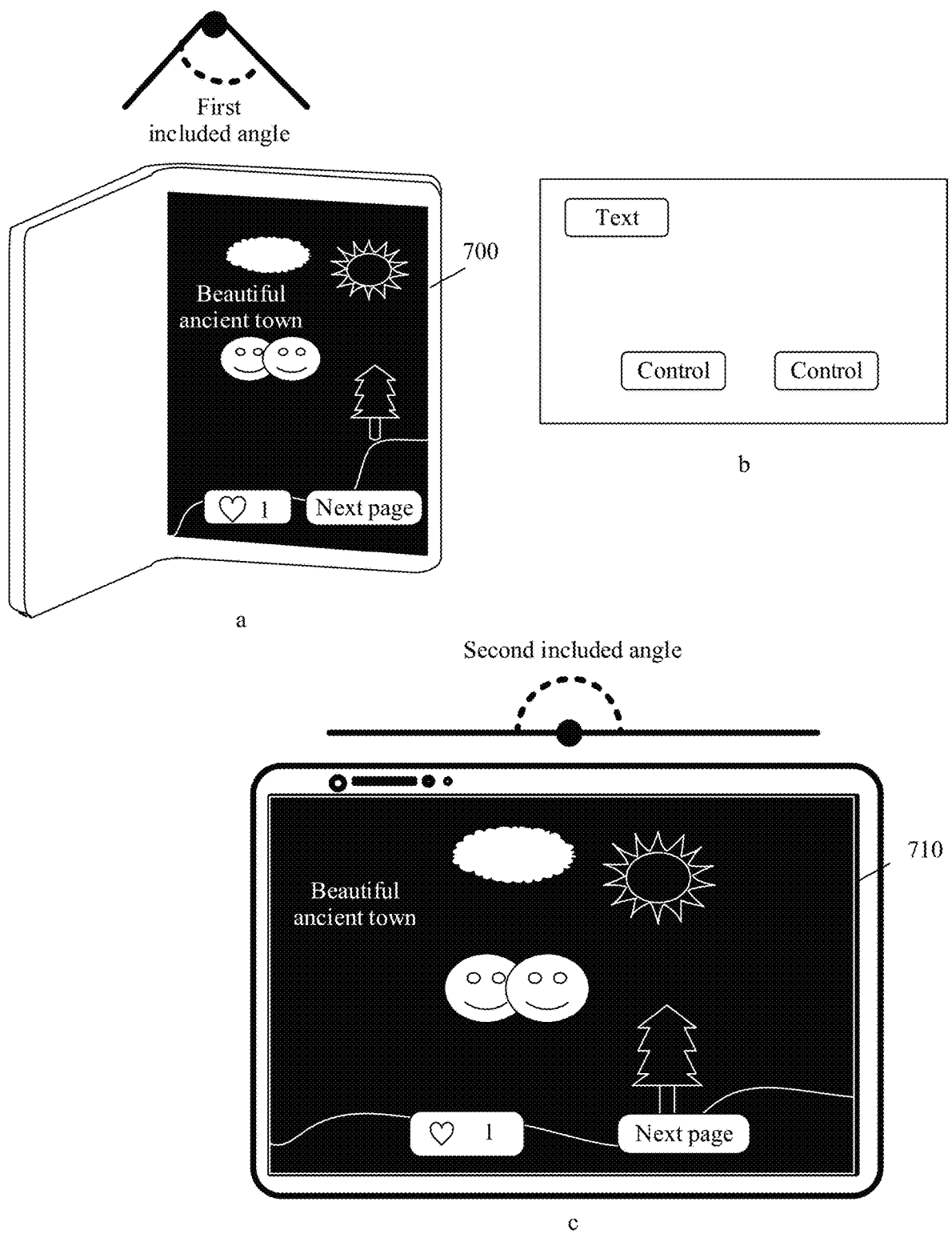
FIG. 13 is a schematic diagram of an interface of a smartphone with a foldable touchscreen according to an embodiment of this application.

It is assumed that the smartphone 10 supports folding, for example, the smartphone 10 may be expanded from a first included angle to a second included angle. The included angle refers to an included angle between two screens of a foldable touchscreen. When a to-be-generated interface is an interface in a fully expanded state shown in c in FIG. 13, the device 200 obtains a configuration parameter of the display of the smartphone 10 in a in FIG. 13, for example, an aspect ratio, resolution, or a folding angle of the display of the smartphone 10. The device 200 obtains an interface layout template corresponding to the configuration parameter. In some embodiments, the device 200 may obtain an arrangement manner template, a location template, an alignment manner template, a control location template, and the like that are corresponding to the configuration parameter, and finally generate an interface layout template shown in b in FIG. 13.

Figure 7:
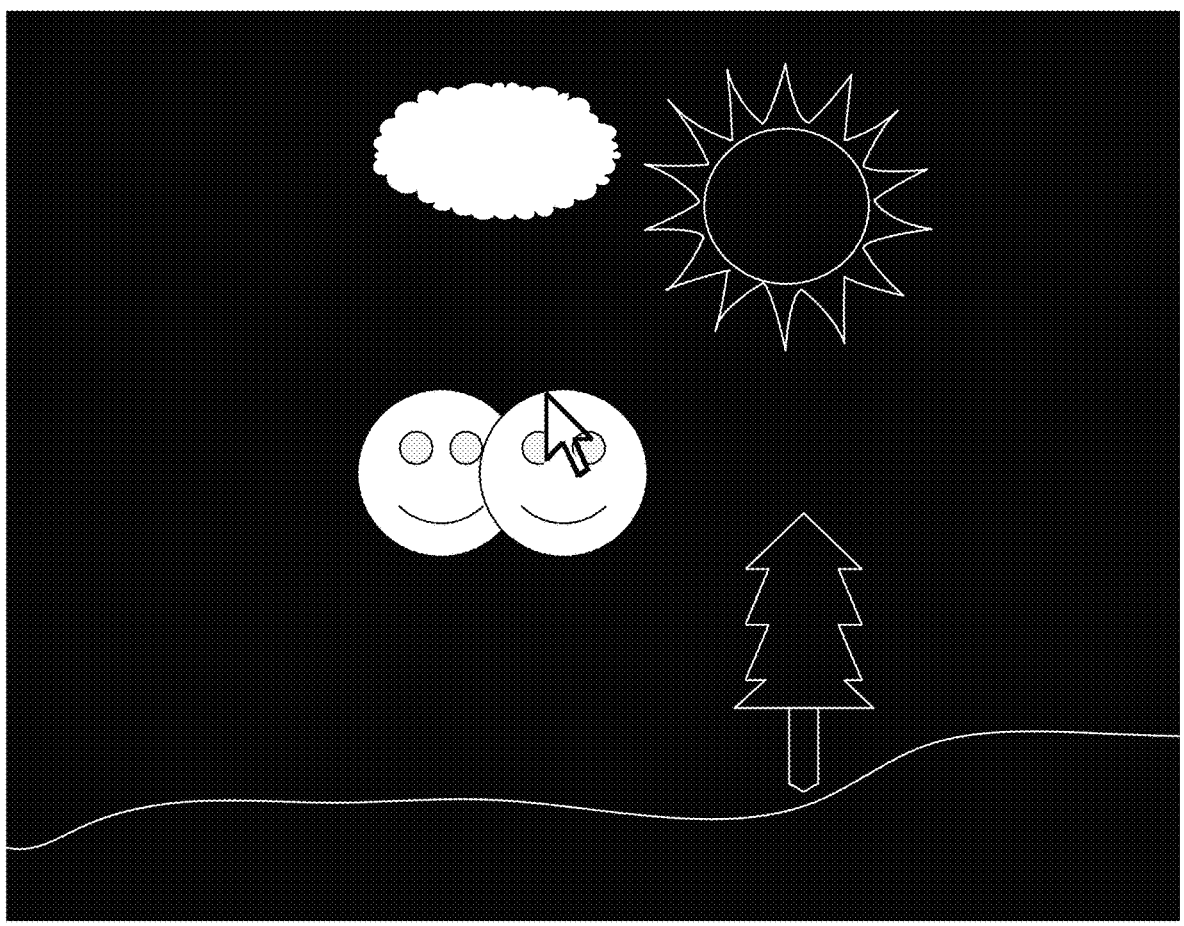
FIG. 7 is a schematic diagram of visual elements of a reference interface according to an embodiment of this application.
Figure 8A:
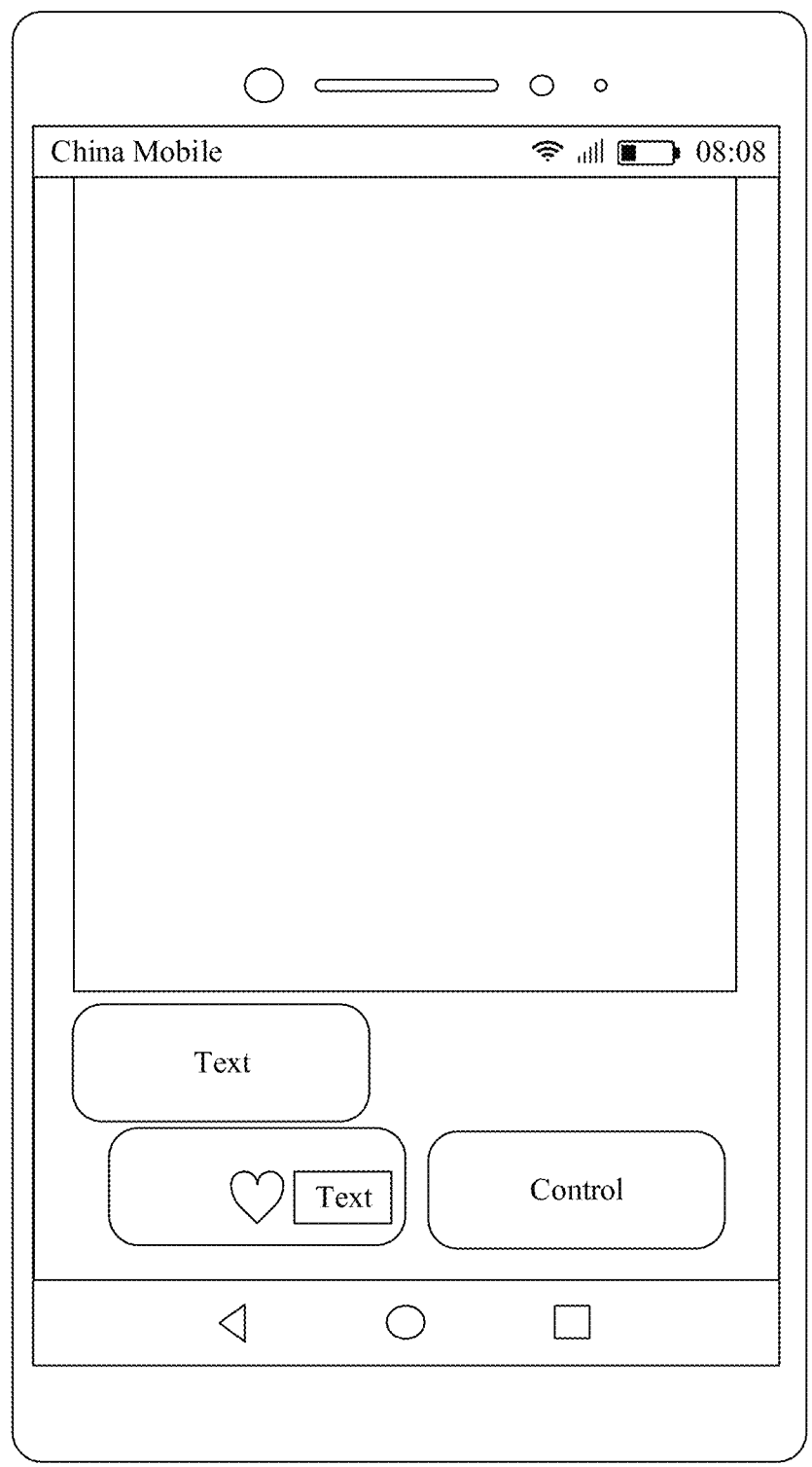
FIG. 8a and FIG. 8b are each a schematic diagram of an interface of a smartphone according to an embodiment of this application.
Figure 8B:
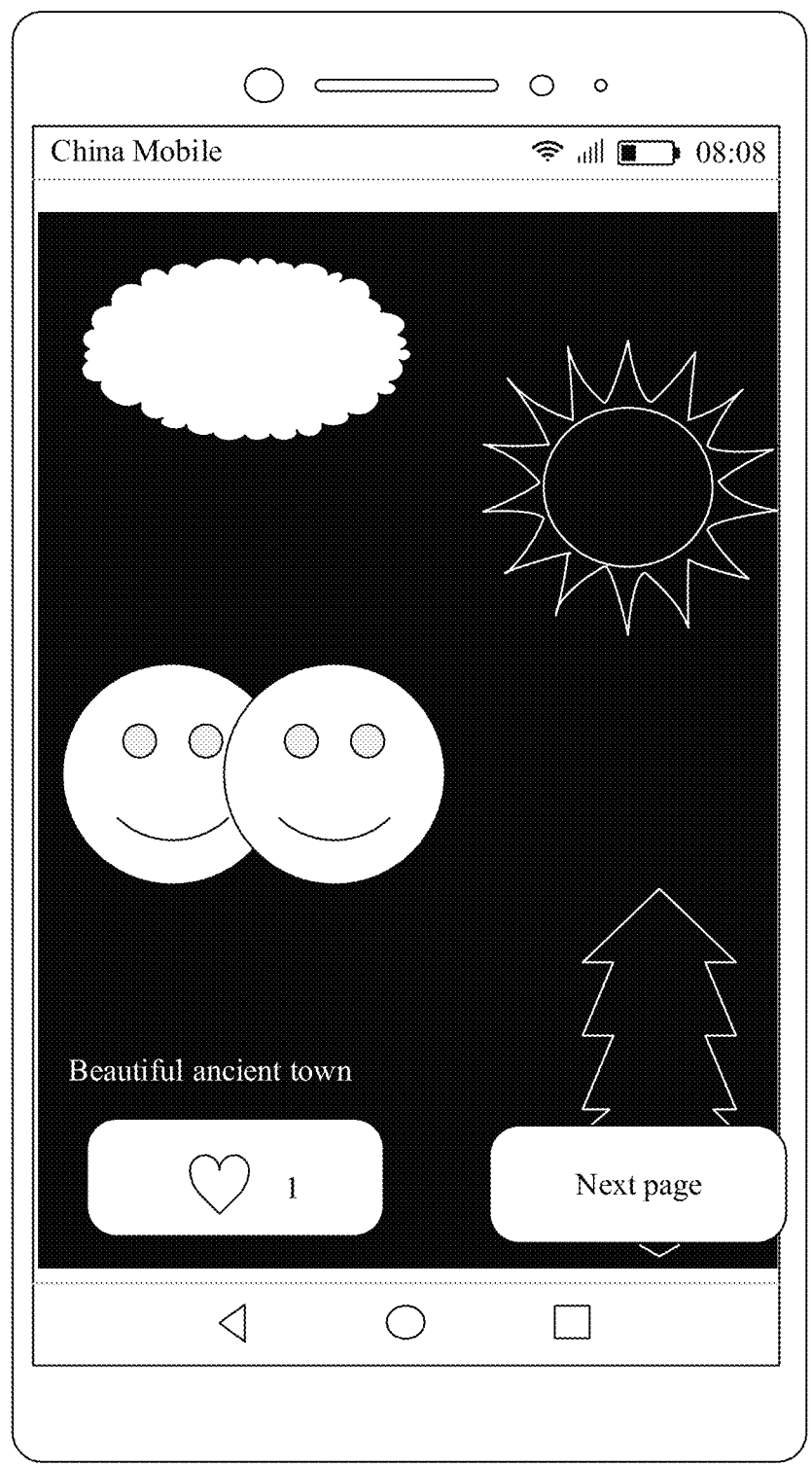

The device 200 determines a visual focus (where the visual focus is an arrow location shown in FIG. 7) of the visual element based on a color, a picture type, and an image recognition result of the visual element shown in FIG. 7. The device 200 crops and scales the visual element by using the visual focus as a center point of the to-be-generated interface, adjusts a layout of the visual element on the to-be-generated interface based on the interface layout template shown in b in FIG. 13, and finally generates an interface shown in c in FIG. 13.

Scenario 7

Figure 14A:
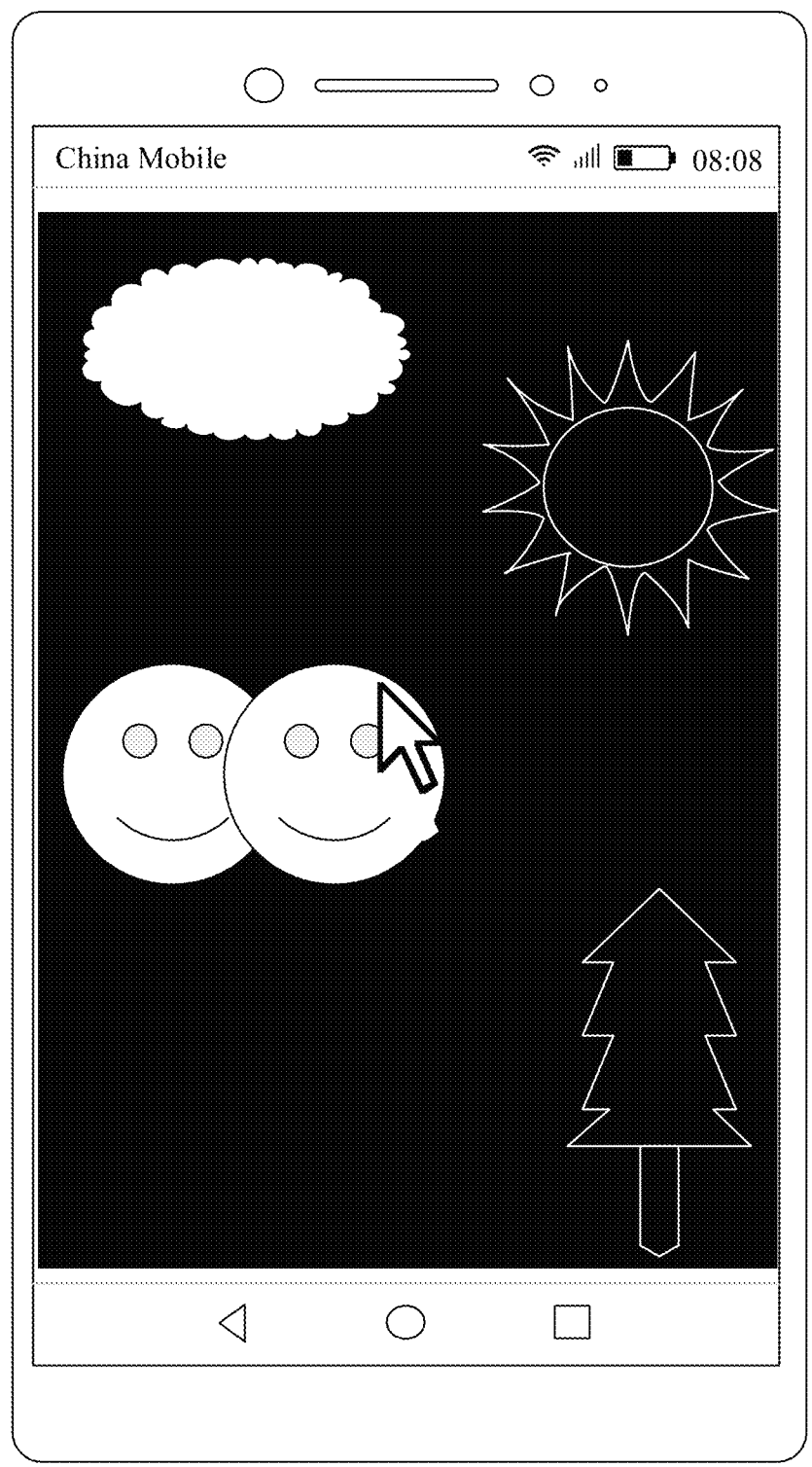
FIG. 14a to FIG. 14c are each a schematic diagram of an interface of a smartphone supporting screen splitting according to an embodiment of this application.
Figure 14B:
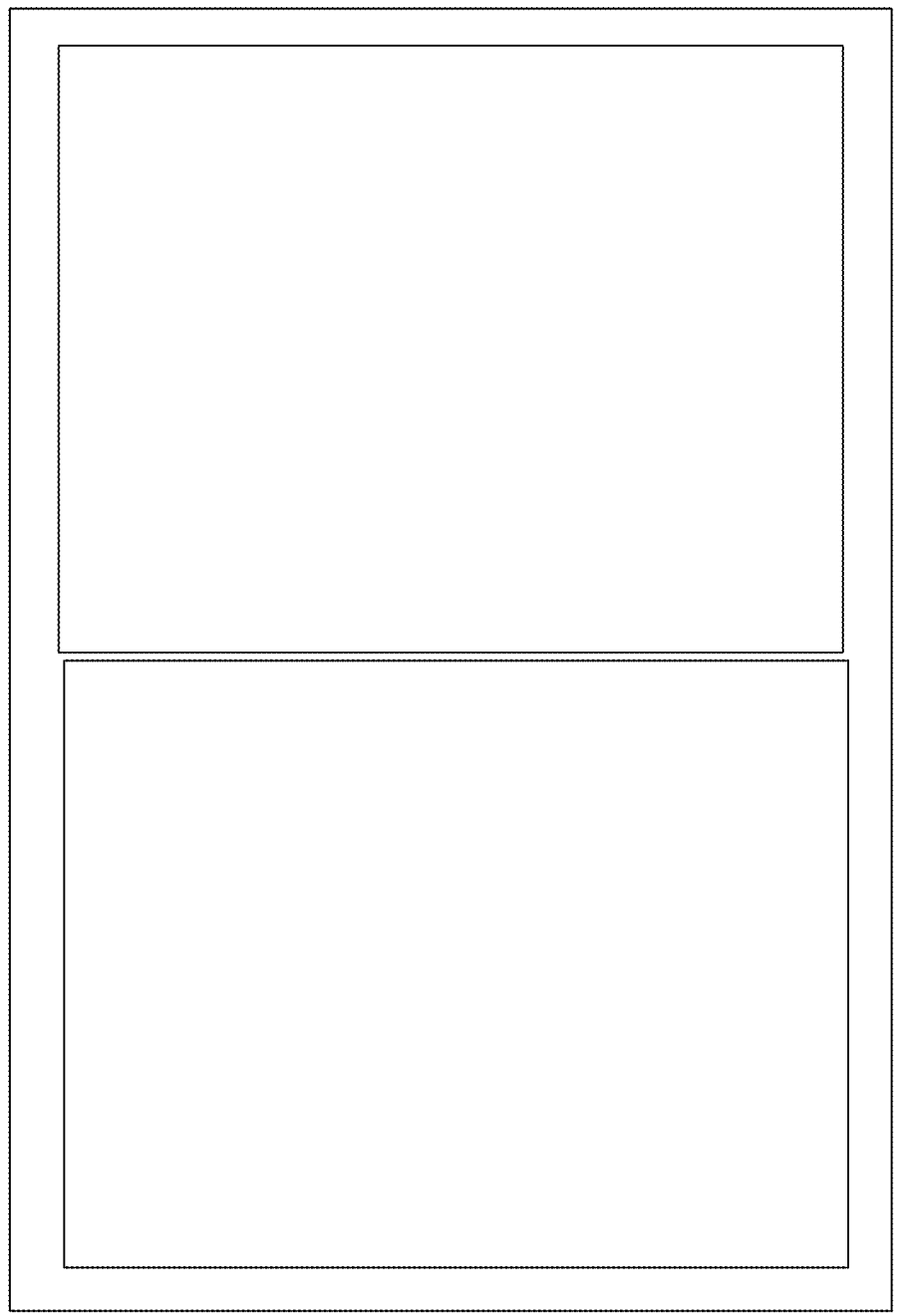
Figure 14C:
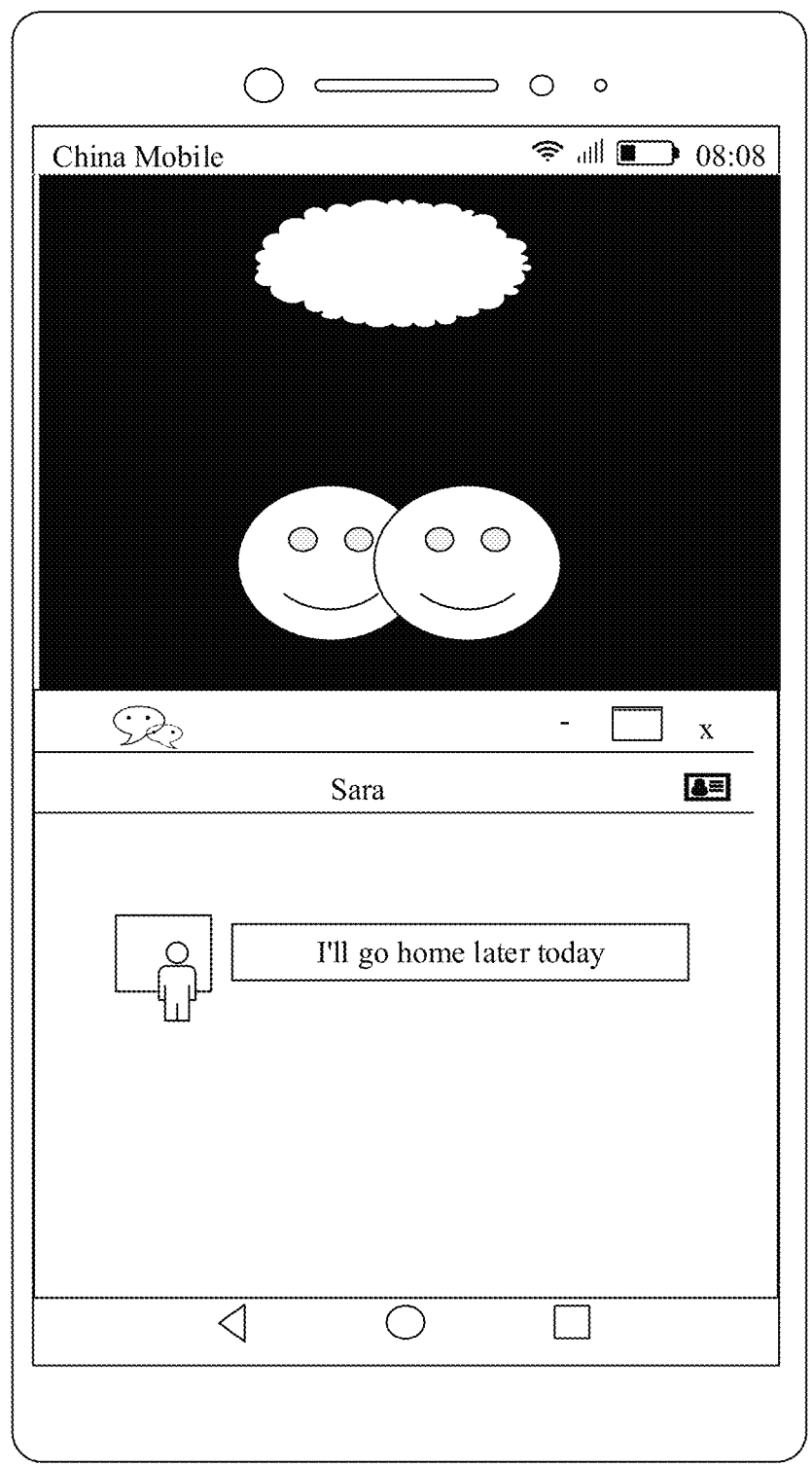

It is assumed that the smartphone 10 supports screen splitting. For example, screen splitting is performed on the smartphone 10. After screen splitting, an upper half part is an interface of a gallery application, and a lower half part is an interface of a WeChat application. When a to-be-generated interface is an interface in a split-screen state shown in FIG. 14*c*, the device 200 obtains a configuration parameter of the display of the smartphone 10 in FIG. 14*a*, for example, an aspect ratio, resolution, or a split-screen state of the display of the smartphone 10. The device 200 obtains an interface layout template corresponding to the configuration parameter. In some embodiments, the device 200 may obtain an arrangement manner template, a location template, an alignment manner template, a control location template, and the like that are corresponding to the configuration parameter, and finally generate an interface layout template shown in FIG. 14*b*.

The device 200 determines a visual focus (where the visual focus is an arrow location shown in FIG. 7) of the visual element based on a color, a picture type, and an image recognition result of the visual element shown in FIG. 7. The device 200 crops and scales the visual element by using the visual focus as a center point of a to-be-generated interface, adjusts a layout of the visual element on the to-be-generated interface based on the interface layout template shown in FIG. 14b, and finally generates an interface shown in FIG. 14c.

Figure 15A:
FIG. 15a to FIG. 15c are schematic diagrams of interfaces of a plurality of types of terminal devices according to an embodiment of this application.
Figure 15B:
Figure 15C:

For another example, a magazine lock screen interface of the smart TV is shown in FIG. 15a. The device 200 obtains a visual element of a reference interface shown in FIG. 15a, and generates, according to the foregoing interface generation method, a magazine lock screen interface 1501 of the smartphone shown in FIG. 15b and a magazine lock screen interface 1502 of the smart watch shown in FIG. 15c by using the visual element.

Figure 16:
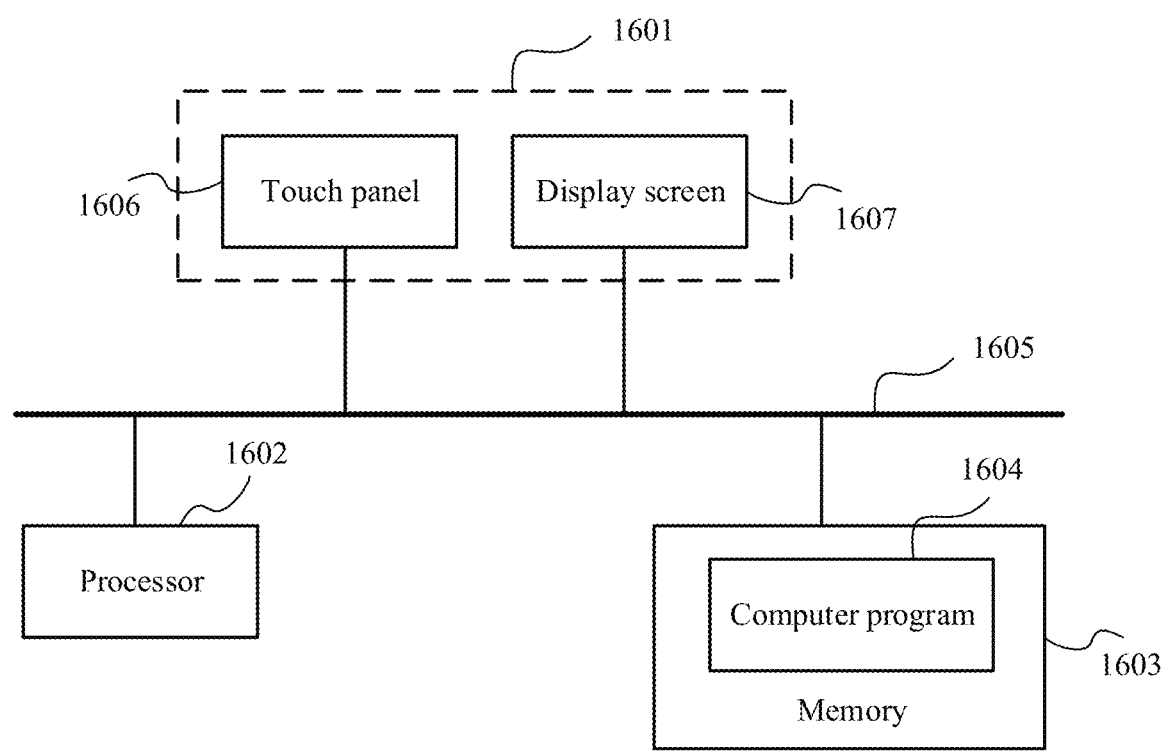
FIG. 16 is a schematic diagram of a structure of a terminal device according to an embodiment of this application.

In some other embodiments of this application, the embodiments of this application disclose a device having a development function. As shown in FIG. 16, the device may include a touchscreen 1601, where the touchscreen 1601 includes a touch panel 1606 and a display 1607, one or more processors 1602, a memory 1603, one or more applications (not shown), and one or more computer programs 1604. The foregoing components may be connected by using one or more communication buses 1605. The one or more computer programs 1604 are stored in the memory 1603 and configured to be executed by the one or more processors 1602. The one or more computer programs 1604 include instructions, and the instructions may be used to perform the operations in the corresponding embodiment in FIG. 5.

An embodiment of this application further provides a computer storage medium. The computer storage medium stores computer instructions. When the computer instructions are run on the device, the device is enabled to perform the related method operations to implement the interface generation method in the foregoing embodiments.

An embodiment of this application further provides a computer program product. When the computer program product is run on a computer, the computer is enabled to perform the foregoing related operations, to implement the interface generation method in the foregoing embodiments.

In addition, an embodiment of this application further provides an apparatus. The apparatus may be specifically a chip, a component, or a module. The apparatus may include a processor and a memory that are connected. The memory is configured to store computer execution instructions. When the apparatus runs, the processor may execute the computer execution instructions stored in the memory, to enable the chip to perform the interface generation method in the foregoing method embodiments.

The device, the computer storage medium, the computer program product, or the chip provided in the embodiments of this application is configured to perform the corresponding method provided above. Therefore, for beneficial effects that can be achieved, refer to the beneficial effects in the corresponding method provided above. Details are not described herein again.

Based on the foregoing descriptions of the implementations, a person skilled in the art may understand that for the purpose of convenient and brief descriptions, division into the foregoing functional modules is merely used as an example for description. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on an actual requirement to achieve an objective of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the operations of the methods described in the embodiments of this application. The foregoing storage medium includes any medium that can store program code, such as a USB flash drive, a removable hard disk, a read only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An interface generation method, applied to a device having a development function, wherein the method comprises:
   obtaining a visual element of a reference interface;
   obtaining configuration information of a display of a target terminal device;
   determining a visual focus of the visual element based on attribute information of the visual element, wherein the attribute information includes a size, a center point, resolution, and a color of the visual element;
   determining, based on the configuration information of the display, an interface layout template corresponding to the configuration information;
   adjusting, based on at least one of the visual focus or the interface layout template, a layout of the visual element on a to-be-generated interface, wherein
   the target terminal device supports a screen splitting function, a display mode of the to-be-generated interface is a screen splitting mode, and the to-be-generated interface comprises a first to-be-generated interface of a first application and a second to-be-generated interface of a second application;
obtaining a first visual element of a reference interface of the first application and a second visual element of a reference interface of the second application;
determining a first visual focus of the first to-be-generated interface of the first application based on attribute information of the first visual element, and determining a second visual focus of the second to-be-generated interface of the second application based on attribute information of the second visual element;
determining, based on the configuration information of the display and the screen splitting mode, the interface layout template of the to-be-generated interface in the screen splitting mode;
adjusting a layout of the first visual element on the first to-be-generated interface based on the interface layout template of the to-be-generated interface in the screen splitting mode and the first visual focus, and generating an interface of the first application; and
adjusting a layout of the second visual element on the second to-be-generated interface based on the interface layout template of the to-be-generated interface in the screen splitting mode and the second visual focus, and generating an interface of the second application.

2. The method of claim 1, wherein the determining the visual focus of the visual element based on the attribute information of the visual element comprises:
determining a center point of the reference interface consisting of the visual element as a first reference visual focus;
performing image content recognition on the visual element, and determining a second reference visual focus corresponding to an image content recognition result;
determining a third reference visual focus corresponding to at least one of color information and a picture type that are of the visual element; and
aggregating the first reference visual focus, the second reference visual focus, and the third reference visual focus to obtain the visual focus of the visual element.

3. The method of claim 1, wherein the adjusting, based on the visual focus and the interface layout template, the layout of the visual element on the to-be-generated interface comprises:
adjusting, based on the interface layout template, a location of the visual element on the to-be-generated interface, and adjusting a location of a control on the to-be-generated interface; and
cropping and/or scaling the visual element by using the visual focus as a central point of the to-be-generated interface, and adjusting a size of the control.

4. The method of claim 1, wherein the configuration information of the display comprises at least one of the following content: a shape of the display, resolution of the display, whether touch is supported, or whether folding is supported; and
the interface layout template comprises at least one of the following content: an interface display style, a layout parameter, or a control response manner.

5. A device, comprising a processor and a memory, wherein
the memory is configured to store instructions, which when executed by the processor, cause the device to:
obtain a visual element of a reference interface;
obtain configuration information of a display of a target terminal device;
determine a visual focus of the visual element based on attribute information of the visual element, wherein the attribute information includes a size, a center point, resolution, and a color of the visual element;
determine, based on the configuration information of the display, an interface layout template corresponding to the configuration information; and
adjust, based on at least one of the visual focus or the interface layout template, a layout of the visual element on a to-be-generated interface, wherein
the target terminal device supports a screen splitting function, a display mode of the to-be-generated interface is a screen splitting mode, and the to-be-generated interface comprises a first to-be-generated interface of a first application and a second to-be-generated interface of a second application, and
when the instructions stored in the memory are executed by the processor, the device is enabled to perform:
obtaining a first visual element of a reference interface of the first application and a second visual element of a reference interface of the second application;
determining a first visual focus of the first to-be-generated interface of the first application based on attribute information of the first visual element, and determining a second visual focus of the second to-be-generated interface of the second application based on attribute information of the second visual element;
determining, based on the configuration information of the display and the screen splitting mode, the interface layout template of the to-be-generated interface in the screen splitting mode;
adjusting a layout of the first visual element on the first to-be-generated interface based on the interface layout template of the to-be-generated interface in the screen splitting mode and the first visual focus, and generating an interface of the first application; and
adjusting a layout of the second visual element on the second to-be-generated interface based on the interface layout template of the to-be-generated interface in the screen splitting mode and the second visual focus, and generating an interface of the second application.

6. The device of claim 5, wherein the instructions, when executed by the processor, further cause the device to:
determine a center point of the reference interface consisting of the visual element as a first reference visual focus;
perform image content recognition on the visual element, and determining a second reference visual focus corresponding to an image content recognition result;
determine a third reference visual focus corresponding to at least one of color information and a picture type that are of the visual element; and
aggregate the first reference visual focus, the second reference visual focus, and the third reference visual focus to obtain the visual focus of the visual element.

7. The device of claim 5, wherein the instructions, when executed by the processor, further cause the device to:
adjust, based on the interface layout template, a location of the visual element on the to-be-generated interface, and adjusting a location of a control on the to-be-generated interface; and at least one of:
crop the visual element by using the visual focus as a central point of the to-be-generated interface, and adjusting a size of the control, or
scale the visual element by using the visual focus as a central point of the to-be-generated interface, and adjusting a size of the control.

8. The device of claim 5, wherein the configuration information of the display comprises at least one of the following content: a shape of the display, resolution of the display, whether touch is supported, or whether folding is supported; and the interface layout template comprises at least one of the following content: an interface display style, a layout parameter, or a control response manner.

9. A non-transitory computer-readable storage medium, comprising computer instructions, wherein when the computer instructions are run on a device, the device is enabled to perform an interface generation method, the method comprising:

obtaining a visual element of a reference interface;

obtaining configuration information of a display of a target terminal device;

determining a visual focus of the visual element based on attribute information of the visual element, wherein the attribute information includes a size, a center point, resolution, and a color of the visual element;

determining, based on the configuration information of the display, an interface layout template corresponding to the configuration information;

adjusting, based on at least one of the visual focus or the interface layout template, a layout of the visual element on a to-be-generated interface, wherein the target terminal device supports a screen splitting function, a display mode of the to-be-generated interface is a screen splitting mode, and the to-be-generated interface comprises a first to-be-generated interface of a first application and a second to-be-generated interface of a second application;

obtaining a first visual element of a reference interface of the first application and a second visual element of a reference interface of the second application;

determining a first visual focus of the first to-be-generated interface of the first application based on attribute information of the first visual element, and determining a second visual focus of the second to-be-generated interface of the second application based on attribute information of the second visual element;

determining, based on the configuration information of the display and the screen splitting mode, the interface layout template of the to-be-generated interface in the screen splitting mode;

adjusting a layout of the first visual element on the first to-be-generated interface based on the interface layout template of the to-be-generated interface in the screen splitting mode and the first visual focus, and generating an interface of the first application; and adjusting a layout of the second visual element on the second to-be-generated interface based on the interface layout template of the to-be-generated interface in the screen splitting mode and the second visual focus, and generating an interface of the second application.

10. The non-transitory computer-readable storage medium of claim 9, the method further comprising:

determine a center point of the reference interface consisting of the visual element as a first reference visual focus;

perform image content recognition on the visual element, and determining a second reference visual focus corresponding to an image content recognition result;

determine a third reference visual focus corresponding to at least one of color information and a picture type that are of the visual element; and aggregate the first reference visual focus, the second reference visual focus, and the third reference visual focus to obtain the visual focus of the visual element.

11. The non-transitory computer-readable storage medium of claim 9, the method further comprising:

adjusting, based on the interface layout template, a location of the visual element on the to-be-generated interface, and adjusting a location of a control on the to-be-generated interface; and at least one of:

cropping the visual element by using the visual focus as a central point of the to-be-generated interface, and adjusting a size of the control, or scaling the visual element by using the visual focus as a central point of the to-be-generated interface, and adjusting a size of the control.

12. The non-transitory computer-readable storage medium of claim 9, wherein the configuration information of the display comprises at least one of the following content: a shape of the display, resolution of the display, whether touch is supported, or whether folding is supported; and the interface layout template comprises at least one of the following content: an interface display style, a layout parameter, or a control response manner.

13. A chip, wherein the chip is coupled to a memory, and is configured to execute a computer program stored in the memory, to perform the interface generation method according to claim 1.

* * * * *